(12) United States Patent
Schwartz et al.

(10) Patent No.: US 12,020,245 B2
(45) Date of Patent: **\*Jun. 25, 2024**

(54) ALERT MANAGEMENT SYSTEM WITH REAL-TIME REMEDIATION AND INTEGRATION WITH THE EXCEPTION ORIGINATING SYSTEM

(71) Applicant: Double Check Solutions, Inc., Encino, CA (US)

(72) Inventors: Joel Schwartz, Encino, CA (US); Anne Vivian Lee, Ellenton, FL (US)

(73) Assignee: Double Check Solutions, Inc., Encino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,029

(22) Filed: Feb. 13, 2023

(65) Prior Publication Data

US 2023/0206227 A1 Jun. 29, 2023

Related U.S. Application Data

(63) Continuation of application No. 17/497,609, filed on Oct. 8, 2021, now Pat. No. 11,610,200, which is a
(Continued)

(51) Int. Cl.
*G06Q 20/00* (2012.01)
*G06F 3/0482* (2013.01)
(Continued)

(52) U.S. Cl.
CPC ......... *G06Q 20/386* (2020.05); *G06F 3/0482* (2013.01); *G06Q 20/40* (2013.01); *H04L 67/02* (2013.01)

(58) Field of Classification Search
CPC .... G06Q 20/386; G06Q 20/40; G06Q 20/102; G06Q 20/108; G06Q 20/227;
(Continued)

(56) References Cited

U.S. PATENT DOCUMENTS 7,175,074 B2 2/2007 Mejias
9,552,584 B1 1/2017 Bierbaum
(Continued)

FOREIGN PATENT DOCUMENTS

WO 2014071261 5/2014
WO WO-2014071261 A1 * 5/2014 ........... G06Q 20/042

OTHER PUBLICATIONS

Foreign Reference is Attached (Year: 2014).*

*Primary Examiner* — Dante Ravetti
(74) *Attorney, Agent, or Firm* — Sheppard Mullin Richter & Hampton LLP

(57) ABSTRACT

An alert management and real-time remediation system is disclosed. The system may receive, from an institution, an electronic file that includes an exception information (EI) data structure comprising exception information representing events and customers associated with the events, and a contact information data structure comprising an electronic address for each customer. The system may automatically parse the EI into events associated with the customers, and for each customer, send an event notification message (EN) to the electronic address of the customer, wherein the event notification message includes a link to an authentication interface of the institution associated with the customer. Responsive to the customer being authenticated by the authentication interface, providing a user interface to the electronic customer device for display to the customer, wherein the user interface displays information for each event associated with the customer and display elements from which a user may select, including a display element for a payment option; and responsive to the customer selecting the payment option, generating and sending a payment message to the institution.

20 Claims, 19 Drawing Sheets

Related U.S. Application Data continuation of application No. 17/187,368, filed on Feb. 26, 2021, now Pat. No. 11,144,917.

(51) Int. Cl.
*G06Q 20/38* (2012.01)
*G06Q 20/40* (2012.01)
*H04L 67/02* (2022.01)

(58) Field of Classification Search
CPC .......... G06Q 20/3221; G06Q 20/3223; G06Q 20/3267; G06Q 20/4014; G06Q 20/4016; G06Q 20/425; G06F 3/0482; H04L 67/02; H04L 63/0815
See application file for complete search history.

(56) References Cited

U.S. PATENT DOCUMENTS

| | | | |
|---|---|---|---|
| 11,004,074 B1 | 5/2021 | Hiccox | |
| 11,144,917 B1 | 10/2021 | Schwartz | |
| 11,615,420 B1 | 3/2023 | Schwartz | |
| 11,847,582 B1 | 12/2023 | Bowers | |
| 2003/0174823 A1 | 9/2003 | Justice | |
| 2004/0111371 A1 | 6/2004 | Friedman | |
| 2004/0243588 A1 | 12/2004 | Tanner | |
| 2005/0125338 A1 | 6/2005 | Tidwell | |
| 2005/0256747 A1 | 11/2005 | Hellrigel | |
| 2006/0106717 A1 | 5/2006 | Randle | |
| 2007/0203741 A1 | 8/2007 | Ordille | |
| 2008/0076504 A1 | 3/2008 | Jenkins | |
| 2008/0215471 A1 | 9/2008 | Michelassi | |
| 2009/0106846 A1 | 4/2009 | Dupray | |
| 2009/0164387 A1 | 6/2009 | Armstrong | |
| 2009/0271277 A1 | 10/2009 | Bishop | |
| 2010/0006643 A1 | 1/2010 | Epstein | |
| 2010/0223470 A1 | 9/2010 | Lord | |
| 2010/0268696 A1 | 10/2010 | Nightengale | |
| 2010/0274691 A1 | 10/2010 | Hammad | |
| 2011/0087598 A1 | 4/2011 | Bozeman | |
| 2011/0125643 A1 | 5/2011 | Cameo | |
| 2011/0150206 A1 | 6/2011 | Pickford | |
| 2011/0213699 A1 | 9/2011 | Johnson | |
| 2012/0054093 A1 | 3/2012 | Schamer | |
| 2012/0066132 A1 | 3/2012 | Bates | |
| 2012/0095913 A1 | 4/2012 | Seay | |
| 2012/0143747 A1 | 6/2012 | Sunde | |
| 2013/0097076 A1 | 4/2013 | Love | |
| 2013/0159080 A1* | 6/2013 | Wu | G06Q 20/36 705/16 |
| 2013/0346302 A1 | 12/2013 | Purves | |
| 2015/0026060 A1 | 1/2015 | Krietzman | |
| 2015/0073986 A1 | 3/2015 | Kligman | |
| 2015/0339637 A1 | 11/2015 | Krietzman | |
| 2015/0339641 A1 | 11/2015 | Krietzman | |
| 2015/0339671 A1 | 11/2015 | Krietzman | |
| 2015/0379644 A1 | 12/2015 | Danielak | |
| 2016/0071106 A1 | 3/2016 | Choudhuri | |
| 2019/0347664 A1 | 11/2019 | Agrawal | |
| 2019/0378182 A1 | 12/2019 | Weinflash | |
| 2020/0005271 A1 | 1/2020 | Baar | |
| 2021/0350340 A1 | 11/2021 | Lai | |

\* cited by examiner

| Date | Time | Account # | Short Name | Current Balance | OD Program Limit | NSF YTD | NSF Last Yr | Tran Code | Amount | Check # / Description | P/R Default | Tracer ID / Sequence / UIC |
|---|---|---|---|---|---|---|---|---|---|---|---|---|
| 2/4/2018 | 6:02:06 AM | 112345 | John Doe | -89.75 | 0.00 | 12 | 63 | 101 | 125.00 | #1235 | R | TID3333 |
| 2/4/2018 | 6:02:06 AM | 521456 | Jane Smith | -90.35 | 100.00 | 1 | 2 | 110 | 295.00 | #8795 | P | TID4567 |
| 2/4/2018 | 6:02:06 AM | 215987 | Susie Saver | -5.00 | 300.00 | 3 | 0 | 105 | 55.32 | Walmart | P | TID8523 |
| 2/4/2018 | 6:02:06 AM | 765285 | Bob's Garage | -256.35 | 150.00 | 1 | 5 | 110 | 456.98 | #123 | P | TID9513 |

FIG. 11

| Date | Time | Account # | Short Name | Phone | Cell | e-mail | 3rd party Phone | 3rd Party Cell | 3rd Party e-mail | Tracex ID / Sequence / UIC |
|---|---|---|---|---|---|---|---|---|---|---|
| 2/4/2018 | 6:02 AM | 112343 | John Doe | XXX-XXX-XXX | XXX-XXX-XXX | john@home.com | | | rob@3party.com | TID3333 |
| 2/4/2018 | 6:02 AM | 321456 | Jane Smith | XXX-XXX-XXX | XXX-XXX-XXX | smith@work.com | XXX-XXX-XXX | XXX-XXX-XXX | ann@3party.com | TID4567 |
| 2/4/2018 | 6:02 AM | 215987 | Susie Saver | XXX-XXX-XXX | XXX-XXX-XXX | sales@home2.com | XXX-XXX-XXX | XXX-XXX-XXX | joe@3party.com | TID8523 |
| 2/4/2018 | 6:02 AM | 765283 | Bob's Garage | XXX-XXX-XXX | XXX-XXX-XXX | bobsgarage@work.com | XXX-XXX-XXX | XXX-XXX-XXX | wife@3rdparty.com | TID9513 |

FIG. 12

| Date | Time | Account # | Short Name | Date Sent | Time Sent | Time Zone | Date Delivered | Time Delivered | Message |
|---|---|---|---|---|---|---|---|---|---|
| 2/4/2018 | 6:02 AM | 112345 | John Doe | | | | | | |
| | | | Phone | 2/4/2018 | 8:05 AM | Pacific | No Answer | No Answer | NSF Alert |
| | | | Text | 2/4/2018 | 8:06 AM | Pacific | 2/4/2018 | 8:05 AM | NSF Alert |
| | | | e-mail | 2/4/2018 | 8:07 AM | Mountain | 2/4/2018 | bounce back | NSF Alert |
| | | 3rd Party | Phone | 2/4/2018 | 11:05 AM | Pacific | 2/4/2018 | 11:10 AM | Contact John |
| | | 3rd Party | Text | 2/4/2018 | 11:06 AM | Pacific | 2/4/2018 | 11:11 AM | Contact John |
| | | 3rd Party | e-mail | 2/4/2018 | 11:07 AM | Mountain | 2/4/2018 | 11:12 AM | Contact John |

Thank you!

Your Transaction is complete

Have a question? Contact us
1-888-HollywdCU

Transaction Information

Name: Joel Schwartz
Time / Date: Today at 10:15 am, August 20th, 2020
Reference #: 123456789
Payment Method: Credit Card 1234
Amount Paid: $263.25
Status: Completed

ALERT MANAGEMENT SYSTEM WITH REAL-TIME REMEDIATION AND INTEGRATION WITH THE EXCEPTION ORIGINATING SYSTEM

CROSS REFERENCE TO RELATED APPLICATIONS

This application is a continuation of U.S. patent application Ser. No. 17/497,609, filed Oct. 8, 2021, entitled "ALERT MANAGEMENT SYSTEM WITH REAL-TIME REMEDIATION AND INTEGRATION WITH THE EXCEPTION ORIGINATING SYSTEM", which is a continuation of U.S. patent application Ser. No. 17/187,368, filed Feb. 26, 2021, entitled "ALERT MANAGEMENT SYSTEM WITH REAL-TIME REMEDIATION AND INTEGRATION WITH THE EXCEPTION ORIGINATING SYSTEM" (which issued as U.S. Pat. No. 11,144,917 on Oct. 12, 2021), which are hereby incorporated herein by reference in their entirety. The present application is related to U.S. Patent Publication No. US 2015/0026060 A1, filed Jul. 7, 2014 entitled "FINANCIAL ALERT MANAGEMENT SYSTEM HAVING A MOBILE DEVICE", the disclosure thereof incorporated by reference herein in its entirety.

FIELD OF THE INVENTION

A technology platform for real-time management of time-sensitive exception notifications and integration with the exception originating system.

BACKGROUND

Various technologies exist to provide alerts to users. The existing technologies have various technical problems and other deficiencies. In many cases, the technology provides an alert, but lacks a technical mechanism for the user to take action. In other cases, where multiple parties are involved, the technology is deficient in that it fails to enable users to take action and provide necessary real-time updates to all of the involved parties' systems. In some cases, where an entity provides limited access to their servers and/or other computer systems, manual notification of user action may be required. This is a technical limitation, especially when there is a time-sensitive need for a user to receive an alert, take action on the alert and have the entity, whose systems provide limited access, updated on the action. Often, prior systems include a manual notification to such entities which is ineffective with there is a time-sensitive deadline. These and other technical problems exist.

Alert management systems have applicability to many industries and many practical applications. Without limitation, one practical application relates to various fintech solutions. In particular, various technologies exist to facilitate the ability for a customer to be notified of an action that needs to be taken with respect to a financial or other account. These technologies suffer from the above-referenced and other drawbacks. Moreover, the technical drawbacks of prior systems in the fintech space are exacerbated by some of the regulatory issues, complexity and multiple parties involved in the system. Multiple examples of this exist.

As just one example, the technical and other implications of what happens when a negotiable instrument (such as, for example, a check or an ACH withdrawal) is not honored by the financial institution associated with the account on which the negotiable instrument is drawn, i.e., the payor bank are explained below.

It is possible that a negotiable instrument may be generated that for a number of different reasons may not be honored by the financial institution associated with the account on which the negotiable instrument is drawn, i.e., the payor bank. One reason might be that there are insufficient funds available in the account on which the negotiable instrument is attempting to be drawn. This is generally termed a non-sufficient funds (NSF) event. Similarly, a situation where the funds deposited in the account have not yet cleared (i.e., making the funds unavailable) is generally termed an uncollected funds (UCF) event. In this description, both NSF events and UCF events will be referred to as NSF events, unless specified otherwise.

The reason for the insufficient (i.e., inadequate) funds may be that the account is overdrawn (i.e., an overdraft has occurred, and money has been withdrawn from the account in an amount that has caused the available balance in the account to be less than zero) or because the amount listed on the negotiable instrument exceeds the available balance in the account even though that balance is an amount greater than zero but less than the amount listed on the negotiable instrument. Since checks, drafts, substitute checks and ACH withdrawals are negotiable instruments that are processed using the normal clearing method versus other transactions that are approved and cleared at the point of the transaction like ATM withdrawals, on-us check and draft cashes, and point of sale transactions, the financial institutions associated with the account my refuse to pay the negotiable instrument (in this example a non-preauthorized withdrawal request) and return the negotiable instrument as unpaid.

Unfortunately, even though the payor's financial institution may refuse to honor a negotiable instrument if it is drawn against insufficient or unavailable funds, the reality is that if the bearer of the negotiable instrument (i.e., the payee) does not physically come to the payor's financial institutions to cash the negotiable instrument but instead deposits the check into his/her account (i.e., payee account) at a different financial institution, then via overnight processing the payor's financial institution may automatically pay/credit the amount listed on the negotiable instrument to payee's account. Then, only after payor's financial institution performs a clearing process, will payor's financial institution learn that the negotiable instrument actually caused an NSF event (also known as an NSF occurrence).

On the payor side of the equation, payor's financial institution will generate an NSF notification and issue a NSF notice. Once the payee's financial institution sends the item back in the return check file, the payee's financial institution will repay the amount received less a charge for the risk incurred. Further, the payor financial institution will not honor the negotiable instrument, and will send the payor an NSF notification via first class mail, and additionally charge the payor a fee for generating a "bad" negotiable instrument.

On the payee side of the equation, the payee is sent a Returned Deposited Item (RDI) notice, and generally will be charged a fee from his/her financial intuition for the negotiable instrument. Additionally, the payee may have written negotiable instruments against the payor's negotiable instrument thereby creating a snowball effect of bad instruments.

At this point, the payee is left with the sole responsibility of collecting from the payor the outstanding monetary amount listed on the negotiable instrument as well as any associated penalties, costs and fees. This may lead the payee to bring legal action against the payor. Moreover, the payee's financial institution may also report the payor to a database for bad check writers such as, for example, Check Connection, TeleCheck, Shared Check Authorization Network ("SCAN") or ChexSystems. Finally, knowingly passing a "bad check" is a crime in most states with a range of criminal penalties.

Each business day, every depositary financial institution generates Exception Information (EI) following reconciling accounts with the corresponding negotiable instruments received the previous business day. The EI may contains either all transactions that were presented the previous day that resulted in insufficient funds or only the items presented that caused an insufficient balance. Typically, for each NSF occurrence, the EI includes information about the corresponding account and the corresponding account holder.

In order to better understand the above discussed problem, the problem is now describe in detail with reference to FIG. 1. FIG. 1 is a block diagram of an example of an implementation of a known way of paying with a negotiable instrument 100 between two people.

In this example, the first person is a payor 102 and the second person is a payee 104. The payor 102 has a payor account 106 at a payor financial institution (FI) 108. The payee 104 has a payee account 110 at a payee FI 112. In this example, the payor FI 108 and payee FI 112 are in signal communication with each other over a signal path 114 which may include any known communication network 116. The communication network 116 may be a computer network such as, for example, the Internet, or a proprietary secure network. The signal path 114 between the payor FI 108 and payee FI 112 may include a payor computer server 118 (at the payor FI 108) and a payee computer server 120 (at the payee FI 112). The payor 102, payee 104, or both, may be business entities or individuals. The payor account 106, payee account 110, or both, may be checking accounts. The communication network 116 may be in signal communication with a regional Federal Reserve Bank 117.

In an example of operation, the payor 102 generates 122 the negotiable instrument 100 that lists a monetary amount and passes it to the payee 104 physically or electronically. In this example, the negotiable instrument 100 is drawn on the payor account 106 such that the payor 102 is a "Drawer" of the payor account 106 and the payor FI 108 is a "Drawee" because the payor FI 108 is where the negotiable instrument 100 can be presented for payment from the payor account 106. The payee 104 deposits the negotiable instrument 100 into the payee account 110 physically or electronically. Once the negotiable instrument 100 is deposited into the payee account 110, the payee FI 112 may present the negotiable instrument 100 to the payor FI 108 for payment via the signal path 114 that includes the communication network 116. In response, the payor FI 108 sends a payment 132 in the monetary amount listed on the negotiable instrument 100 via payor computer server 118. The payor FI 108 may utilize a Check 21 system or other interbank transaction system.

In this example, once the payor FI 108 has sent the payment 132 to the payee FI 112, the payor FI 108 withdraws the funds from the payor account 106 and determines whether sufficient funds are available in the payor account 106 to pay the listed monetary amount of the negotiable instrument 100. If the funds are available in the payor account 106, the listed monetary amount of the negotiable instrument 100 is withdrawn from the payor account 106 to satisfy the payment 132 made by the payor FI 108. If, instead, the payor FI 108 determines that there are insufficient funds in the payor account 106 to pay the listed monetary amount of the negotiable instrument 100, the clearing process designates the negotiable instrument 100 as causing an NSF occurrence and then places it as an NSF item on an EI that will be generated the next day by the payor FI 108. In this example, the clearing process may be performed by a computer system such as, for example, a reconciliation system 134. The reconciliation system 134 may be optionally part of the payor server 118 or another independent computer system of the payor FI 108. The reconciliation system 134 may include software that includes rules and decisions engines/modules to reconcile the amount paid on behalf of the payor 102 with the funds available from the payor account 106. The reconciliation system 134 has access to the payor FI 108 customer lists and corresponding accounts such that it may generate a daily EI 136 that includes either all items presented that result in a non-sufficient balance or all NSF occurrences with the corresponding negotiable instruments that caused the NSF occurrences, the corresponding accounts of the negotiable instruments, and the corresponding customer information of the accounts. This EI 136 may then be received and reviewed by a manager 138 of the payor FI 108.

In some exceptional cases, the manager 138 notices the payor 102 is listed on the EI 136 as a result of negotiable instrument 100 causing a NSF occurrence and the manager 138 subjectively considers the payor 102 an important or favorite customer of the payor FI 108. The manager 138, in some instances, may have the discretion to have the payor FI 108 pay the negotiable instrument 100 and because the negotiable instrument is then marked "pay," a NSF notification 139 is sent to the payor 102 if the balance is still insufficient and the payee FI 112 does not receive the NSF item back in the returned items file.

In another example, the manager 138 or other FI 108 representative may notify the payor 102 of the need to cover the negotiable instrument 100 on the EI. In order to cover the instrument 100, the payor must physically pay the manager or a designee, and the manager or designee must locate the NSF record in the payor FI 108 system and manually mark the negotiable instrument 100 as "pay."

But if the payor 102 does not deposit the funds within the time allowed by the payor FI 108, the payor FI 108 will send the item to the payee FI 112 in the returned check file marked as NSF.

As noted above, this process is entirely time-sensitive yet requires manual operations. If the payor does not pay the required amount within the FI predetermined time period, the payor will still be listed as having an NSF occurrence, and the associated negotiable instrument that caused the NSF occurrence will not be honored and will be returned for insufficient funds. Furthermore, even if the payor commences payment of the required amount within the FI predetermined time period, the payment may not settle until after expiration of the FI predetermined time period, with the same result.

As such, there is a need for a system and method that improves the processing of NSF occurrences so as to address the above described problems.

SUMMARY OF THE INVENTION

One aspect of the invention relates to an improved technology platform for a financial alert management and real-time remediation system (FAMS). The platform may include some or all of the following technical components and features.

The FAMS includes a set of computer-software modules (executed on a processor) that can generate alerts, also referred to herein as notifications, and allow a customer to manage and control an outcome, within a designated period of time, based upon the customer's decisions and actions in a real-time environment. It also includes intelligent data analytics that derive scores based upon historical data that indicate how "good" individual customers are in following through with payments to cure NSF events. The FAMS provides a technical solution that leverages the real-time communication to empower customers, including individuals and businesses, to act to minimize expenses that would otherwise be incurred as well as protect their credit standing, reputation, and identity. In addition, it allows a protective and secure means to exchange information, remedy situations, and provide options in a real-time environment, that will benefit the customer.

The FI electronically generates exception information (EI) describing one or more events, (e.g., NSF or other events) and automatically transmits the EI to the platform. The system may be configured so that the EI has a particular data structure. One component of the data structure may include information about specific rules applicable to the specific events in the EI. The rules may be based on a set of information related to the particular events and a set of rules in a rules database. Thus, the rules for one event may differ from those of another. The platform parses the EI into events, processes the events in the EI in accordance with the rules, and generates a customized electronic notification to a customer along with a link. The link enables the customer to access the platform after authentication by a single sign on (SSO) feature associated with the customer account at the FI, for example using a browser execution on a customer device. After authentication, the FI SSO interface may redirect the customer browser to the platform. The platform generate a user interface to display the events, a time frame for response, action options (e.g., pay, report fraud, return the negotiable instrument unpaid), any fees associated with the action (which may vary from one user to the next based on the rules associated with each event), and if a pay action is selected, one or more payment options, including payment options that are enabled directly from the platform, without the user having to use a separate website or application.

After the customer views the exception notification, they may choose an action via a user interface that presents a set of options, including the option to provide a payment to address the event. If the customer selects the pay action, the platform facilitates real-time communication of the customer selection and any payment information received from the customer to the FI to enable the prompt and automated posting of payment directly to the customer account without the need for further manual interaction.

The FAMS reduces the occurrence of a non-payment event where the payor FI refuses to pay a negotiable instrument generated by a payor having a payor account at the payor FI, where the negotiable instrument has caused a non-sufficient funds (NSF) event because the monetary amount of the negotiable instrument exceeds the available funds amount in the payor account.

The FAMS may include a communication module, a database, a timing module, a second communication module, a decision module, a payment module, and a settlement module. A controller may be in signal communication with the first communication module, second communication module, payment module, timing module, and database. The controller is configured to control the operation of the system. The first communication module is configured to receive an EI, payor contact data, and a FI predetermined time period from the payor FI. The payor FI produces the EI that includes all of the events presented and processed through nightly processing that resulted in a final non-sufficient balance.

The payor contact data includes contact information for payor, and the FI predetermined time period for receiving funds to cover the NSF event before the occurrence of the non-payment event where the payor FI refuses to pay the negotiable instrument. The database is configured to store the NSF events from the EI and utilize the contact information for the payor from the payor contact data. The timing module is configured to generate a FAMS time period based on the FI predetermined time period. The second communication module is configured to attempt communication with the payor based on the contact information for the payor and, if successful, communicate to the payor the NSF event, options to take action to change the order of the events by selecting "Pay", "Return", or "Fraudulent", and/or paying the amount necessary to cure the NSF event. The payment module is configured to receive a payment from the payor.

As an example of operation, the system performs a method that reduces the occurrence of a non-payment event where the payor FI refuses to pay the negotiable instrument generated by the payor, where the negotiable instrument has caused a NSF event because the monetary amount of the negotiable instrument exceeds the available funds amount in the payor account. The method may include (electronically) receiving the EI (e.g., as a data structure) including, for example, payor contact data, FI predetermined time period, rules and/or other data from the payor FI, parsing the data structure to extract the various components, storing the data items, including the NSF events from the EI, and storing the contact information for the payor from the payor contact data.

The method may further include generating a FAMS time period based on the FI predetermined time period, and attempting communication with the payor based on the contact information forth payor. If the attempted communication is successful, the method may include communicating to the payor in real time the NSF event, the option to take action, the amount necessary to cure the NSF event, and the FAMS time period. The method may include receiving a payment from the payor.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 11 shows an example EI data structure that includes tabular data regarding the NSF events and contact information for the payors corresponding to the NSF events.

FIG. 12 shows an example contact data structure that includes contact information related to each customer shown in FIG. 11.

FIG. 13 shows an example contact results data structure.

FIG. 14 shows an example summary of NSF events that may be provided by the FAMS to a FAMS administrative user.

FIG. 17 depicts an example confirmation a customer receives for reference.

FIG. 18 depicts an example settlement summary provided to the payor FI to assist in balancing each day's settlement process.

The figures are not exhaustive and do not limit the present disclosure to the precise form disclosed.

DETAILED DESCRIPTION

Embodiments of the disclosed technology include a financial alert management system with real-time remediation (FAMS) that may interact with one or more FI, one or more customer electronic devices, and one or more external payment provider systems. In the described embodiments, the FAMS is separate system from the payor FI. For example, the FAMS may comprise a server programmed with computer instructions to be operated to provide services to various FIs as described herein. In other embodiments, some or all of the elements of the FAMS may be provided and/or operated by the payor FI as part of its internal system. The payor FI may be a bank, savings and loan, credit union, trust company, mortgage loan company, or a similar FI. The external payment providers may be, for example, credit card companies, online payment companies, or similar FIs.

The FAMS includes a server programmed with a set of software modules that allow a customer to manage and control an outcome, within a designated period of time, based upon the customer's decisions and actions in a real-time environment. It also includes intelligent data analytics that derive scores based upon historical data based upon current data from a variety of input sources. The FAMS empowers customers, including individuals and businesses, to act to minimize expenses that would otherwise be incurred as well as protect their credit standing, reputation and identity. In addition, the FAMS allows a protective and secure means to exchange information, remedy situations, and provide options in a real-time environment, that will benefit the customer.

Figure 1:
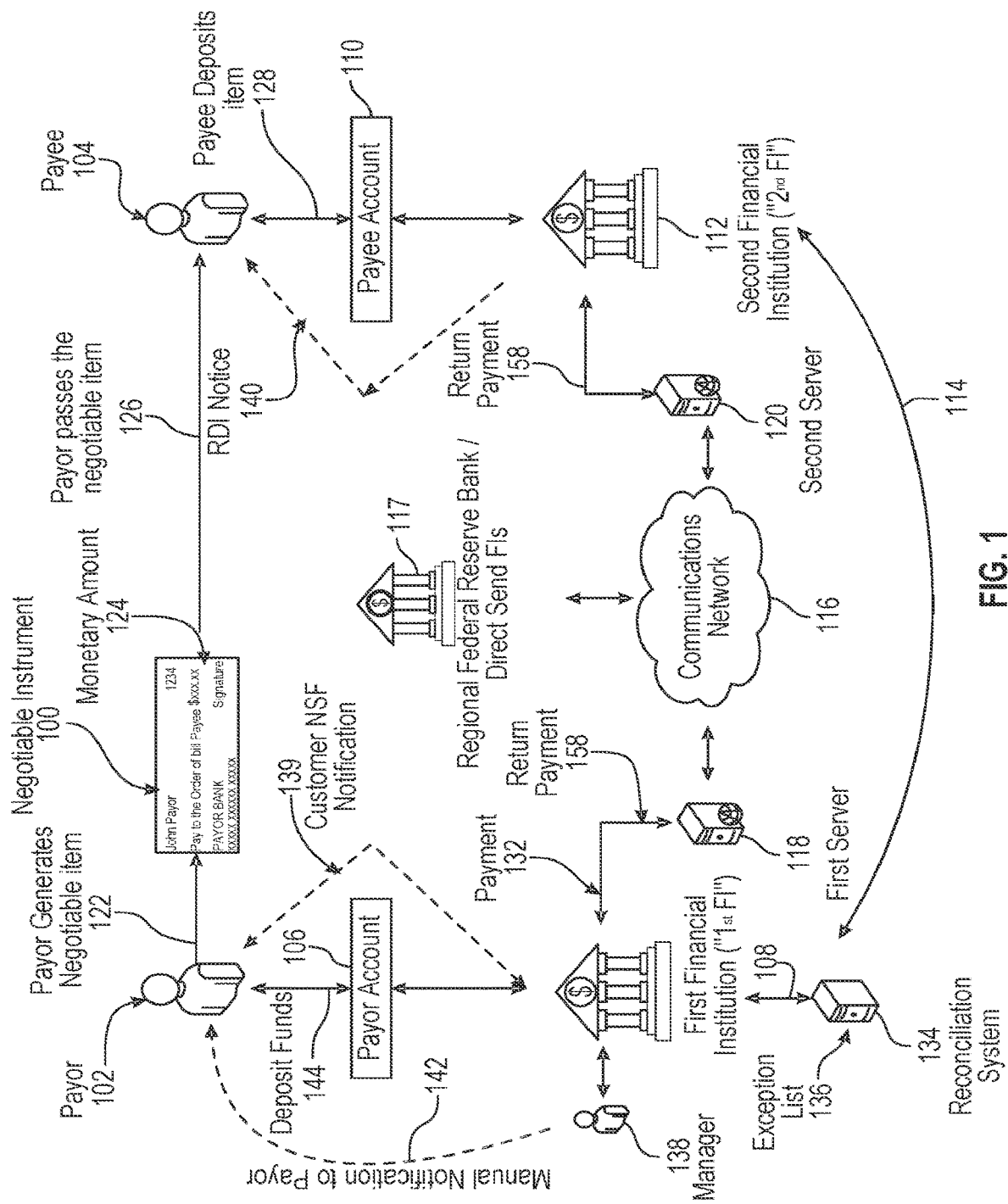
FIG. 1 is a block diagram of an example of an implementation of a known way of paying with a negotiable instrument between two people.
Figure 2:
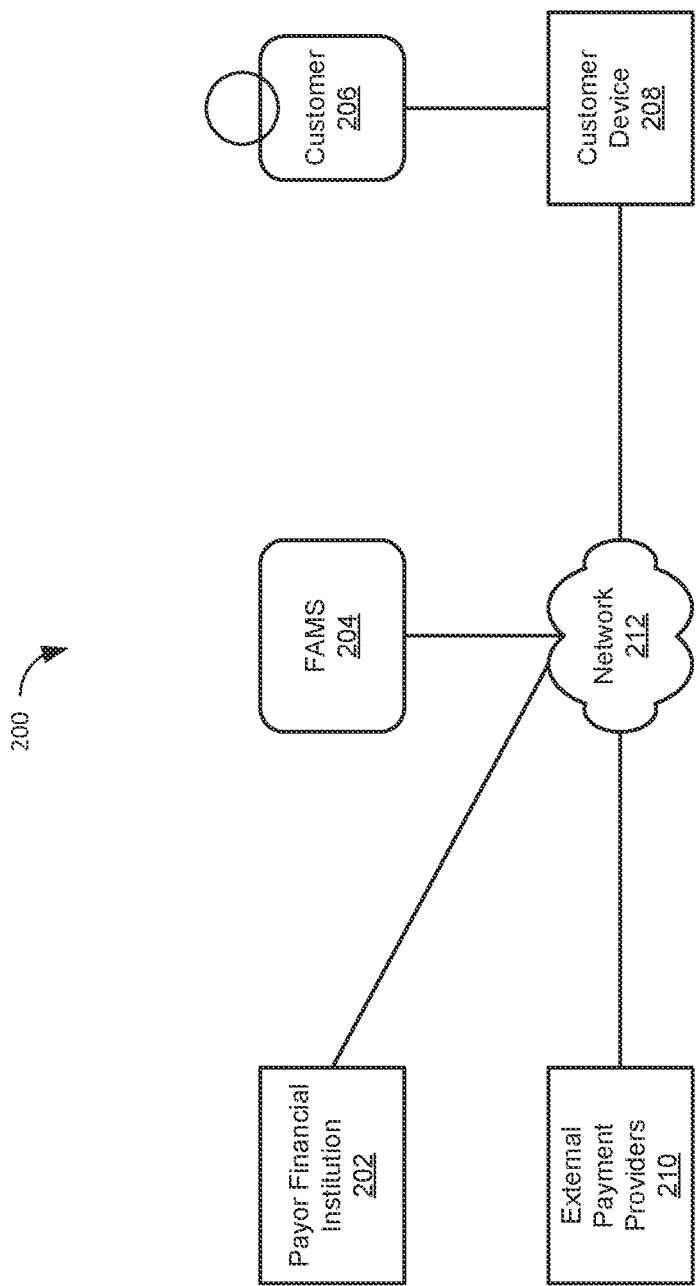
FIG. 2 is a block diagram for a financial system according to some embodiments of the disclosed technology.

FIG. 2 is a block diagram for a financial system 200 according to some embodiments of the disclosed technology. Referring to FIG. 2, the financial system 200 may include a financial alert management system with real-time remediation (FAMS) 204 that may be in network communication (e.g., via network 212) and interact with one or more payor financial institution systems 202, one or more customer devices 208 and one or more external payment provider systems 210.

The FAMS 204 may be implemented as one or more networked computer systems, for example as described in detail below. In the described embodiments, the FAMS 204 is separate system from the payor financial institution system 202. For example, the FAMS 204 may be operated to provide services to the financial institutions. In other embodiments, some or all of the elements of the FAMS 204 may be provided and/or operated by the payor financial institution 202 as part of its internal system.

The payor financial institution may be a bank, savings and loan, credit union, trust company, mortgage loan company, or a similar financial institution. The external payment providers 210 may be, for example, credit card companies, online payment companies, or similar financial institutions.

The customer devices 208 may be operated by a customer 206 having a financial account at the payor financial institution. The customer devices 208 may include, for example, smart phones, tablets, personal computers, and similar electronic devices. The one or more networks 212 (e.g., wired or wireless networks, the internet or other networks) may interconnect and enable communication between the elements of the financial system 200.

Figure 3:
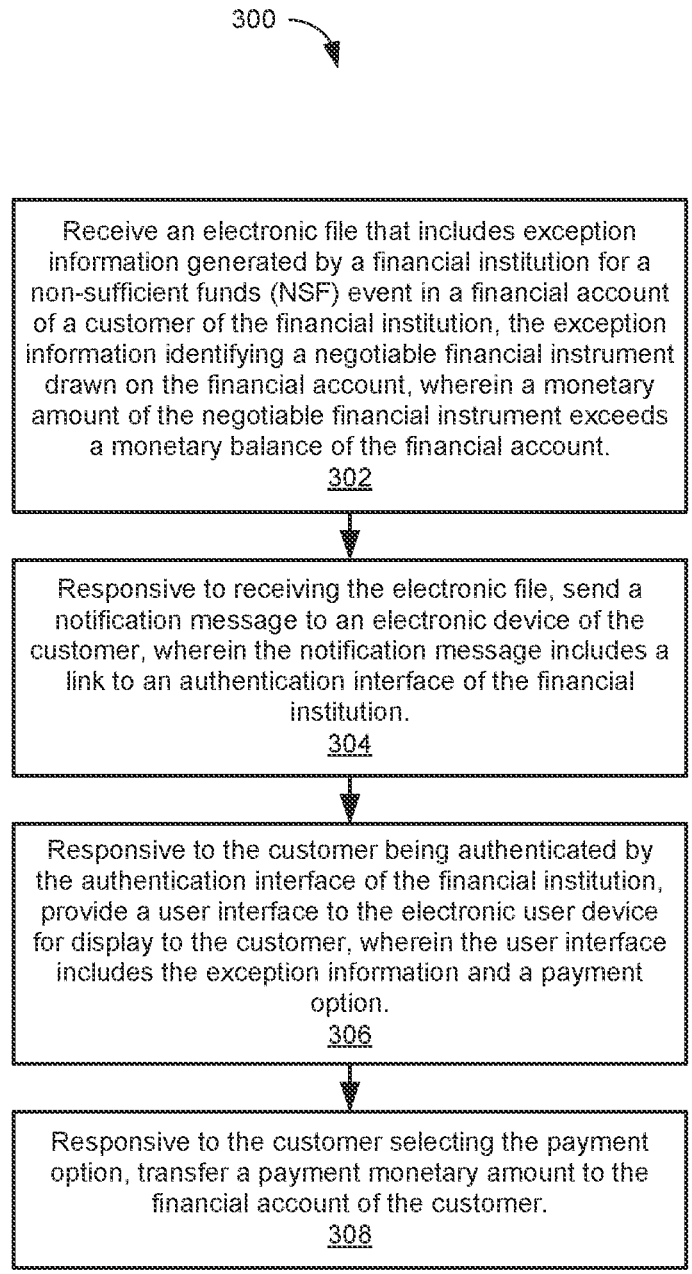
FIG. 3 is a flowchart illustrating a process for a customer to manage NSF events in the customer's account with a financial institution according to some embodiments the disclosed technologies.

FIG. 3 is a flowchart illustrating a process 300 for a customer to manage NSF events in the customer's account with a financial institution according to some embodiments the disclosed technologies. For example, the process 300 may be employed for the customer to manage an NSF event in the customer's checking account when a check drawn on the account exceeds the available balance of the account at the time of presentment. The process 300 is described with reference to FIGS. 2 and 3, and may be executed by the FAMS 204 of FIG. 2.

The elements of the process 300 are presented in one arrangement. However, it should be understood that one or more elements of the process may be performed in a different order, in parallel, omitted entirely, and the like. Furthermore, the process 300 may include other elements in addition to those presented. For example, the process 300 may include error-handling functions if exceptions occur, and the like.

Referring to FIG. 3, the process 300 may include the FI generating an electronic file that includes a set of EI and transmitting that file to the FAMS, at 302. Within the set of EI may be different events for different customers. The EI for each exception may include rules specific to that instance/customer that differ from the rules for another instance/customer.

The exception information may include NSF information describing the event as well as customer information regarding the customer. The NSF information may include the date and time the event was generated, a unique identifier code (UIC) to uniquely identify the event, an account number of the involved customer's account, instrument number(s) of the involved negotiable financial instrument(s) (for example, such as a check number), a monetary amount of each involved negotiable financial instrument, and other information.

The customer information may include the name of the customer, a customer number, contact information of the customer, and other information. The contact information of the customer may include email addresses, phone numbers, and other contact information.

The FAMS may parse and process the file and generate individual event notifications for different customers according to the rules. The individual communications may be customized based on the specific rules for an instance/customer. Inputs to rules for a specific customer may include a score that represents the customer's history in curing NSF events, for example as described below. The rules may determine the amount of fees charged by the FI to cure the events, and the FAMS time period for the customer to cure the NSF events. For example, a customer with a high score may be charged lower fees, and may be given more time.

The rules may consider product types to determine the fees and/or discounts. The FI may establish a product data structure defining product type and product codes. The product code for an event may be obtained from the EI. An example product data structure is shown in

TABLE 1

| Product Type | Product Name | Discount |
| --- | --- | --- |
| 01 | Free Checking | 0% |
| 02 | Econo Checking | 25% |
| 03 | Relationship Chkg | 50% |
| 04 | Private Banking | 75% |

The rules may consider one or more limits. The limits may be defined by the FI, and may be established based upon product code and amount of the event. The FI may establish a limit data structure defining the product types, limits, and discounts. An example limit data structure is shown in Table 2.

TABLE 2

| Product Type | Product Name | Discount | Limit |
| --- | --- | --- | --- |
| 01 | Free Checking | 0% | 5,000 |
| 02 | Econo Checking | 25% | 5,000 |
| 03 | Relationship Chkg | 50% | 10,000 |
| 04 | Private Banking | 75% | 50,000 |

For instance, if the product code=01, no overdrawn amount over $5,000 is presented to the customer. The limit data structure contain logic to trigger alternate communications to the customer, for example to contact the FI for further instructions.

The rules may consider specialty flags, which may include warnings that are handled with additional caution. For example, these warnings may include "account dormant", "post credits only", "reported fraud", or other similar warning flags. Rules for handling specialty flags may consider multiple factors. For example, these factors may include date opened, product type, number of events YTD and more. Specialty flags may trigger a communication change or limited view in the UI for the customer to view and act upon.

The EI may include information relating to a negotiable financial instrument drawn on the financial account, wherein a monetary amount of the negotiable financial instrument exceeds a monetary balance of the financial account (NSF). For example, referring to FIG. 2, the customer 206 may have a checking account with the payor financial institution 202, and the NSF event may result from the customer drawing one or more checks against that account in an amount that exceeds the available balance of the account.

The FAMS 204 may obtain exception information electronically from the payor financial institution 202 in a variety of ways. In some embodiments, the FAMS 204 may poll the payor financial institution 202 to obtain the exception information. In other embodiments, the payor financial institution 202 may push the exception information to the FAMS 204. In some embodiments, the payor financial institution 202 may provide an access process or application programming interface (API) for the FAMS 204 to obtain the exception information. In some embodiments, the FAMS 204 may obtain the exception information by employing robotic process automation that emulates keystrokes of an employee of the payor financial institution 202. In some embodiments, a combination of these techniques may be employed. These techniques may be performed in a highly encrypted security protocol environment.

This technical integration of the FAMS and the payor financial institution to obtain the EI is not conventional, employs a novel technical collaboration between the FAMS computer systems and those of the payor financial institution. Conventionally, the process of receiving EI from an FI is implemented manually, in whole or in part. These manual processes consume valuable time in a process where time is of the essence. The described automated electronic collaboration between the payor FI and the FAMS occurs nearly instantaneously, thereby giving the payor more time to cure the NSF event.

Referring again to FIG. 3, the process 300 may include, responsive to obtaining the exception information, creating and sending one or more custom notification messages to the customer, wherein each notification message includes a link to an authentication interface of the financial institution, at 304. For example, referring again to FIG. 2, after obtaining the exception information, the FAMS 204 may identify the customer 206 according to the customer information in the exception information, and may provide some or all of the exception information to the customer device according to the contact information in the customer information. For example, the notification may include information regarding the time interval during which the customer may cure the exception, such as the end time of the interval and the time remaining in the interval. The notification messages may include emails, text messages, voicemails, robocalls, and similar messages.

The link may be a hyperlink to a single sign-on (SSO) authentication interface of the payor financial institution 202. The customer 206 may enter the link in a browser executing on the customer device 208 to reach the SSO interface, and may be authenticated by logging into the SSO interface, for example by providing a preset user ID and password. In some embodiments, the authentication process may include multifactor authentication.

Referring again to FIG. 3, the process 300 may include, responsive to the customer being authenticated by the authentication interface of the financial institution, providing a user interface to the electronic customer device for display to the customer. The user interface may include the exception information and payment options, at 306. For example, referring again to FIG. 2, the FAMS 204 may provide the user interface to the customer device 208.

The user interface may list the involved negotiable financial instrument(s), and for each of the instruments, information such as check number, amount, and the like. The customer may select the instrument(s) for further action using the user interface. The user interface may also list one or more NSF service fees charged by the financial institution for handling the exception. The customer may select the fee(s) for payment using the user interface. The user interface may list the total amount due. The customer may simply select the total amount due for payment.

Referring again to FIG. 3, the process 300 may include, responsive to the customer selecting a payment option, transferring a payment amount to the financial account of the customer, at 308. The payment monetary amount may be greater than or equal to the difference between the monetary amount of the negotiable financial instrument(s) and the monetary balance of the financial account. For example, the payment monetary amount may be the sum of the service fee(s) and the difference between the monetary amount of the negotiable financial instrument and the monetary balance of the financial account.

In some embodiments, the user interface may list more than one payment method in the user interface. For example, the payment methods may identify accounts the customer has with the external payment providers 210. In such embodiments, responsive to the customer selecting one of the payment methods, the FAMS 205 (or third party) may transfer the payment monetary amount to the financial account of the customer according to the selected payment method.

In some embodiments, the user interface may provide options for actions other than to pay the NSF. For example, the user interface may present an option for a customer to report a fraud concerning the involved negotiable financial instrument(s). In such embodiments, responsive to the customer selecting the option to report a fraud, the FAMS 204 may report the fraud concerning the negotiable financial instrument to the payor financial institution 202.

In some embodiments, responsive to expiration of the time interval for curing the NSF event, the FAMS system may provide an indication of the expiration of the time interval in the user interface, and may disable or remove the payment option from the user interface.

Figure 4:
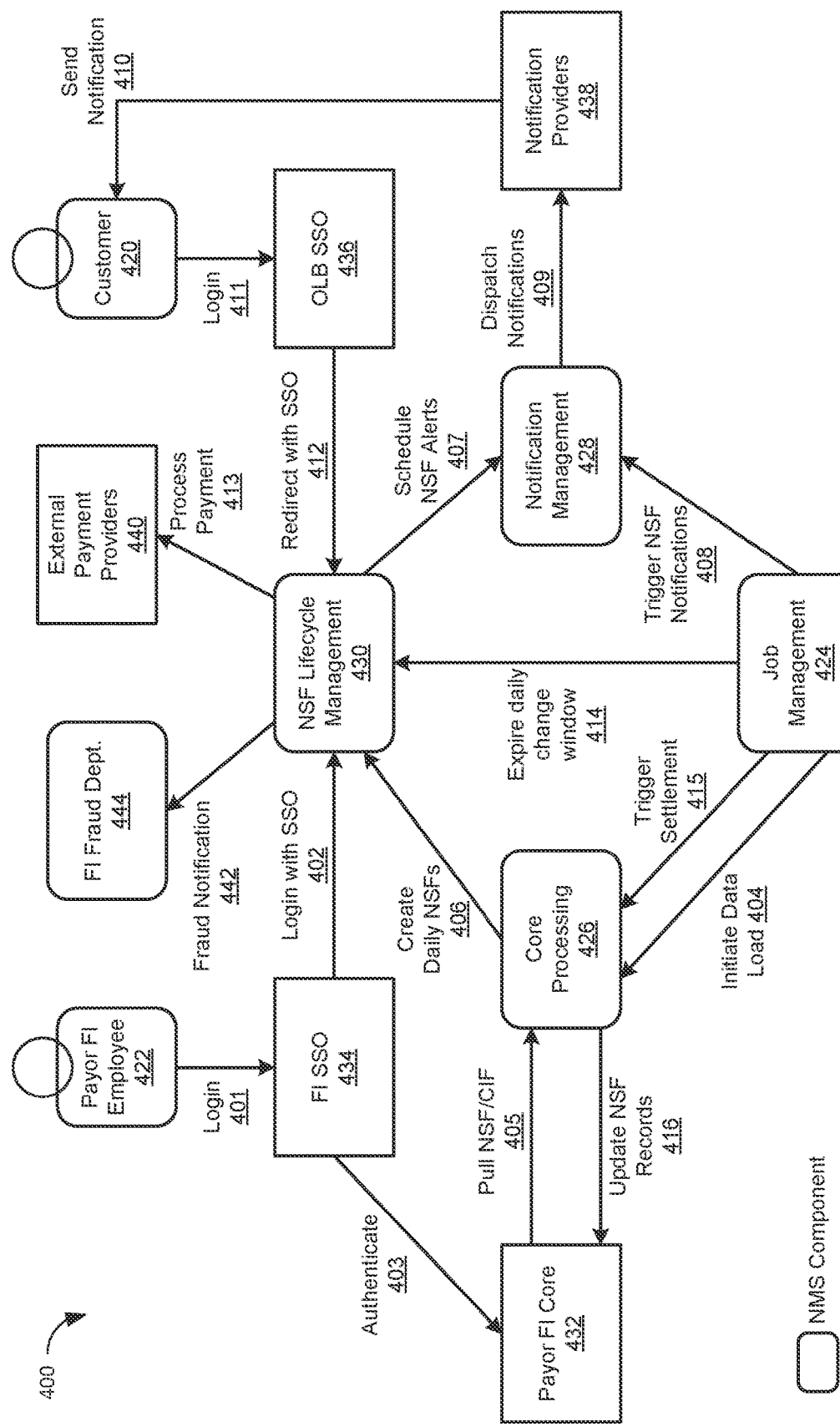
FIG. 4 is a block diagram illustrating components and functions of a financial management system according to some embodiments of the disclosed technologies.

FIG. 4 is a block diagram illustrating components and functions of a financial management system 400 according to some embodiments of the disclosed technologies. Referring to the legend in FIG. 4, components of the FAMS are shown as rounded rectangles, components external to the FAMS are shown as rectangles, and each person is shown as a rounded square with a circle. However, as noted above, in various embodiments, one or more of the FAMS components may be implemented within the payor financial institution. In the described embodiments, each component in FIG. 4 may be implemented as a separate software component. However, in other embodiments, one or more of the components and/or functions may be combined or divided in different ways.

Referring to FIG. 4, the FAMS components may include a job management component 424. The job management component 424 manages daily data processing including ingesting new NSF information for a given processing day, triggering notifications, and triggering the settlement process.

The FAMS components may include a core processing component 426. The core processing component 426 obtains NSF information from the payor financial institution, and performs settlement activities with the payor financial institution.

The FAMS components may include a notification management component 428. The notification management component 428 provides notifications to customers of NSF events as well as performing any other communications with account holders or customers. These communications may include, for example, providing payment receipts and resending notifications. The notification management component 428 may provide notification templates for the notifications, for example including email templates, SMS templates, and similar templates. The templates may be provided by the FI during an onboarding process.

The FAMS components may include an NSF lifecycle management component 430. The NSF lifecycle management component 430 provides features that allow customers and payor financial institution employees to change NSF decisions and cover for insufficient funds during the time interval specified by the payor financial institution.

Referring to FIG. 4, an employee 422 of the payor financial institution may login to a single sign-on (SSO) component 434 of the payor financial institution, at 401. This login process may be implemented for example using Hypertext Transfer Protocol Secure (HTTPS) or a similar protocol, and may employ a FAMS Active Directory or Lightweight Directory Access Protocol (LDAP). In some embodiments, the employee may login and be authenticated through the pre-established bank/credit union SSO authentication process, at 402. In some embodiments, the employee may login and be authenticated through the payor financial institution core component 432, at 403, for example using teller numbers or user IDs.

The job management component 424 may initiate a data load with the core processing component 426, at 404. Responsive to this initiation, the core processing component 426 may ingest electronic files that include EI, NSF, and customer information files (CIF) from the payor financial institution core component 432, at 405. This process may be implemented using REST APIs, SOAP APIs, FTP, and similar communication techniques. The ingestion process may be implemented as a pull operation, a push operation, or a combination of the two.

The core processing component 426 may provide daily NSFs to the NSF lifecycle management component 430, at 406. The daily NSFs may include the event information described above. This process may be implemented using Advanced Message Queuing Protocol (AMQP) or a similar protocol.

The NSF lifecycle management component 430 may schedule NSF alerts with the notification management component 428, at 407. The job management component 424 may trigger NSF notifications with the notification management component 428, at 408. These processes may be implemented using AMQP or a similar protocol.

The notification management component 428 may dispatch the notifications to one or more notification providers 438, at 409. This process may be implemented using HTTPS or a similar protocol. The notification provider(s) 438 may send the notifications to the customer 420, at 410. As noted above, this notification process may be implemented using email, SMS, voicemail, and similar communication techniques.

The customer 420 may respond to the notifications by logging into an online banking (OLB) SSO component 436 of the payor FI, at 411. This login process may be implemented using HTTPS or a similar protocol, and may employ Security Assertion Markup Language (SAML) and OAuth2 or OpenID Connect (OIDC). All operations in consumer mode are limited to the specific account ID as defined by the SSO token provided. NSF events are displayed that are active for the given processing day and have not yet expired per the tenants pre-defined daily expiry time. This process may take the customer on one of two routes. The first route takes the customer directly into their online banking, which may display a specific tab for the customer to access. The second route takes the customer directly to a FAMS server, where the same information may be displayed.

Following a successful login, the OLB SSO component 436 may redirect the customer to the NSF lifecycle management component 430, at 412. This redirect process may be implemented using SAML, OIDC, and similar technologies.

Following the redirect, the customer 420 may interact with the NSF lifecycle management component 430, for example as described above. That is, the NSF lifecycle management component 430 may provide user interfaces to the customer 420 that enable the customer 420 to view event information, make payments to cure NSF events, and take other actions. These interactions may be implemented using HTTPS and similar protocols.

Responsive to the customer 420 selecting a payment method/provider and initiating a payment action, the NSF lifecycle management component 430 processes the payment with the specified external payment provider(s) 440, at 413. The payment process may be implemented using HTTPS and similar protocols.

Responsive to successful completion of the payment process, the job management component 424 may trigger settlement of the payment with the core processing component 426, at 415. This process may be implemented using AMQP and similar protocols.

In response to the settlement trigger, the core processing component 426 may update the NSF records, and pass the updated NSF records to the payor financial institution core component 432, at 416. This process may be implemented using REST APIs, SOAP APIs, FTP, and similar communication techniques. In some embodiments, the FAMS may send additional notifications to the FI. For example, the notifications may include a notification that a particular payor has cured a particular event.

At the end of the time interval specified by the payor financial institution, also referred to as the daily change window, the job management component 424 may expire that interval with the NSF lifecycle management component 430, at 414. This process may be implemented using AMQP and similar protocols. Responsive to expiration of the daily change window, the NSF lifecycle management component 430 may notify customer 420, disable or remove payment options, or both.

In some cases, a customer may report suspected fraud in response to an event. The FAMS may require the customer to confirm such a report. In these cases, the NSF lifecycle management component 430 may issue a fraud notification 442 to the FI fraud department 444. The FI fraud department 444 may conduct an investigation in response to the fraud notification 442.

FIGS. 5-8 show user interfaces that may be created by the FAMS platform and provided to a customer device by the FAMS according to some embodiments of the disclosed technologies. The customer device is depicted and described as a mobile device 500 such as a smartphone or tablet. In other embodiments, the customer device may be a personal computer or similar computing device. In the described embodiments, the interfaces may be provided by a browser executing on the mobile device 500. In other embodiments, the interfaces may be provided to an app executing on the mobile device 500.

Figure 5:
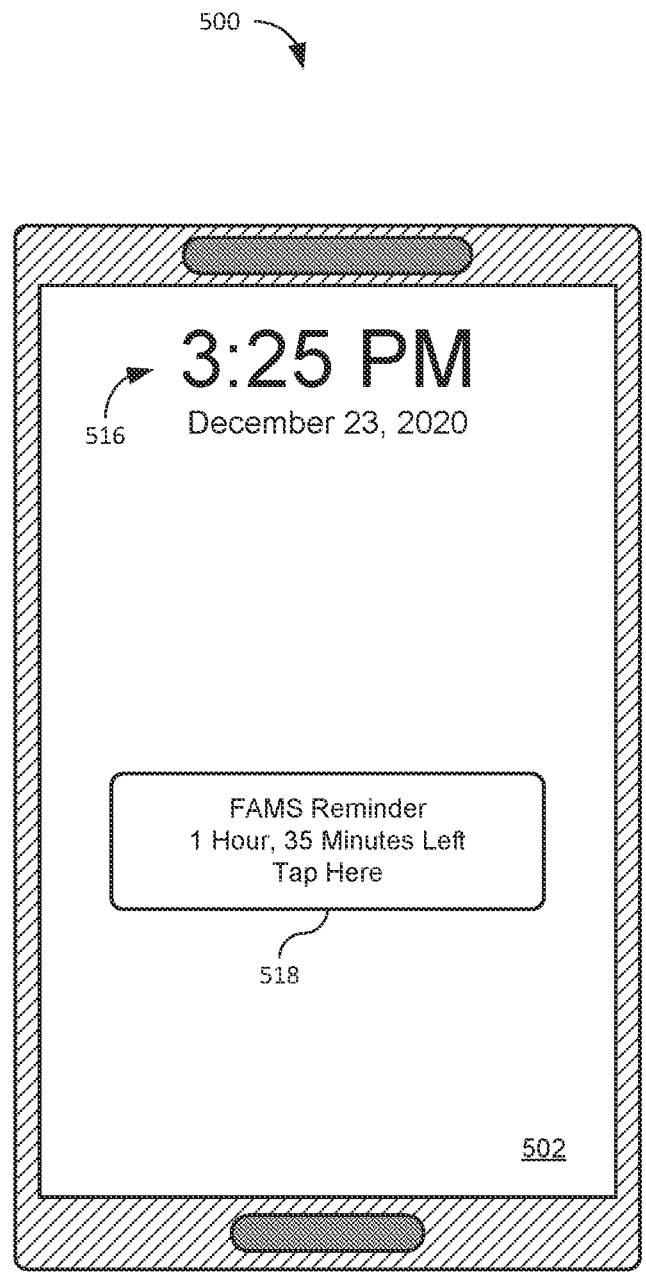
FIG. 5 shows a user interface according to some embodiments the disclosed technologies.
Figure 6:
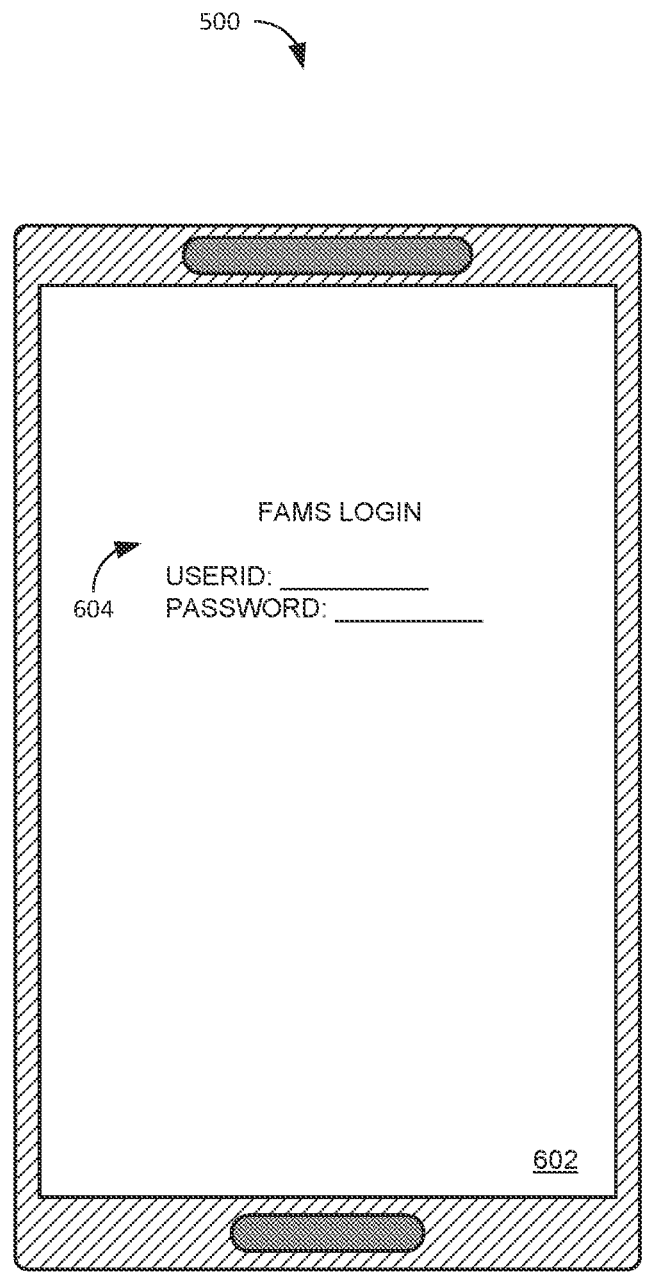
FIG. 6, shows a user interface may be displayed that includes fields for the customer to enter a user identification and password.

Turning to FIG. 5, a user interface 502 includes a plurality of display elements. The user interface 502 may display the current time and date at 516. In the case of an event instance for a payor, an event notification message may be sent according to the payor's contact information, and the UI 502 may generate an event notification 518 (for example a window or other graphical warning display) based on the message. The event notification message may be a text message, email, or a similar text-based message. The display element may display EI information, including for example, "FAMS Reminder, 1 Hour, 35 Minutes left, Tap Here." This event notification 518 visually gives the customer the warning needed that an event has occurred. The event notification 518 may be a pop-up such as, for example, a countdown clock or countdown icon which shows the approaching deadline (i.e., the end of the interval during which the customer may remedy the NSF event.

Figure 7:
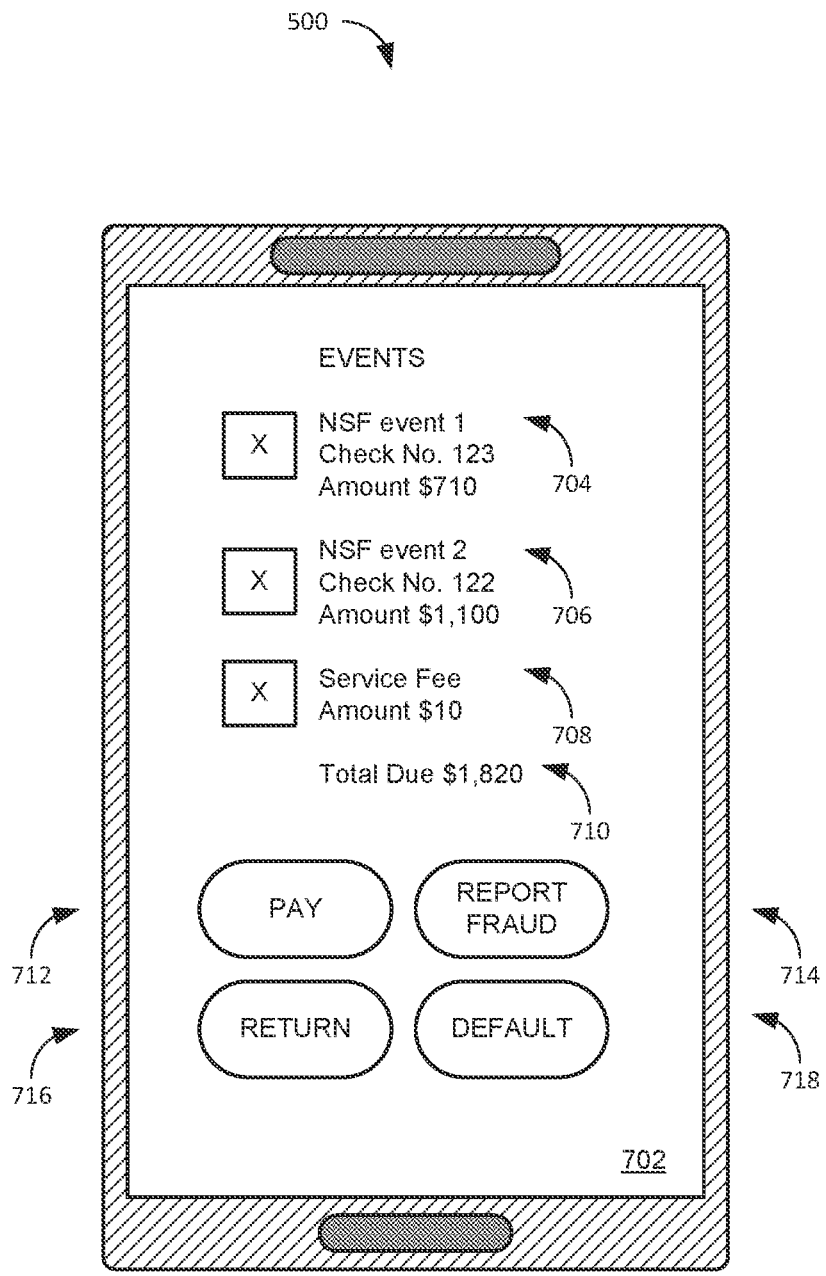
FIG. 7 shows an Events user interface according to some embodiments the disclosed technologies.

Responsive to the customer tapping the event notification 518 in the user interface, a login screen may be presented to the customer. For example, turning to FIG. 6, a user interface 602 may be displayed that includes fields for the customer to enter a user identification and password, at 604. For example, a link in the event notification message may direct a browser of the customer device to the single sign-on (SSO) interface of the payor FI 202, which may provide the user interface 602. The link may include information to enable redirects based on whether the SSO procedure is successful. For example, once the user is successfully authenticated, the payor FI SSO interface may redirect the browser to the FAMS platform. But when the user is not successfully authenticated, the payor FI SSO interface may present an error page, a password recovery page, or the like. The link may include SSO procedure The FAMS platform may then provide an Events screen 702, for example as shown in FIG. 7. The Events screen 702 may include a number of display elements. The display elements may include an events display component corresponding to events obtained by the FAMS, a selection option display component associated with each event by which the user may select one or more events, and a set of action options by which the user can select an action for a set of one or more selected events. For each event instance, the UI 702 may display an event identifier, identification of the subject of the event (e.g., a specific check), an amount associated with the event, and associated fee information. As an example, event one 704 is "NSF event 1, Check No. 123 in the amount of $710." Event two 706 is "NSF event 2, Check No. 122 in the amount of $1,100". Event three 708 is "Service Fee of $10," where the $10 is purely an example amount. The fees may be determined by the FAMS platform (e.g., based on the rules associated with the event).

The customer may then select one or more events (shown by an "X" in the boxes), and one of the actions 712-718. The selected action may be applied to all of the selected events. In the example of FIG. 7, the customer has selected all of the events. When the customer then selects one of the actions, that action is applied to all of the selected events. The total amount to pay may be displayed at 710. A separate "PAY" button 712 may be displayed which the customer can select. In this example, when the customer selects the "PAY" button 712, the FAMS platform applies that action to all of the selected events.

Instead of making a payment, the customer may select other actions, and may select a different action for each NFS event. For example, the customer may report an event as fraud by selecting the event and the "REPORT FRAUD" button 714. The customer may have the negotiable financial instrument involved in an event returned to the payee by selecting the event and the "RETURN" button 716. The customer may apply the payor financial institution's default action to an event returned by selecting the event and the "DEFAULT" button 718.

In some embodiments, the platform may provide occasional reminders until the customer responds or the FAMS time period ends. The reminders may take the same form as the event notification. In some embodiments, the customer may act to end the reminders. Specifically, in this example, if the customer chooses not to pay one, or both, of the NSF events 704 and 706, the user interface may require the customer to confirm that choice. As an example, if the customer selects the first NSF event 704 for $710 but does not select the second NSF event 704 for $1,100, the user interface may pop up another screen (not shown) or graphical display that will ask the customer to confirm that selection. Once the customer confirms the selection, the user interface may inform the FAMS that the customer will not pay the second NSF event 704. The FAMS may create a record of the customer's choice that may be used by the FAMS in reporting to the financial institution.

Figure 8:
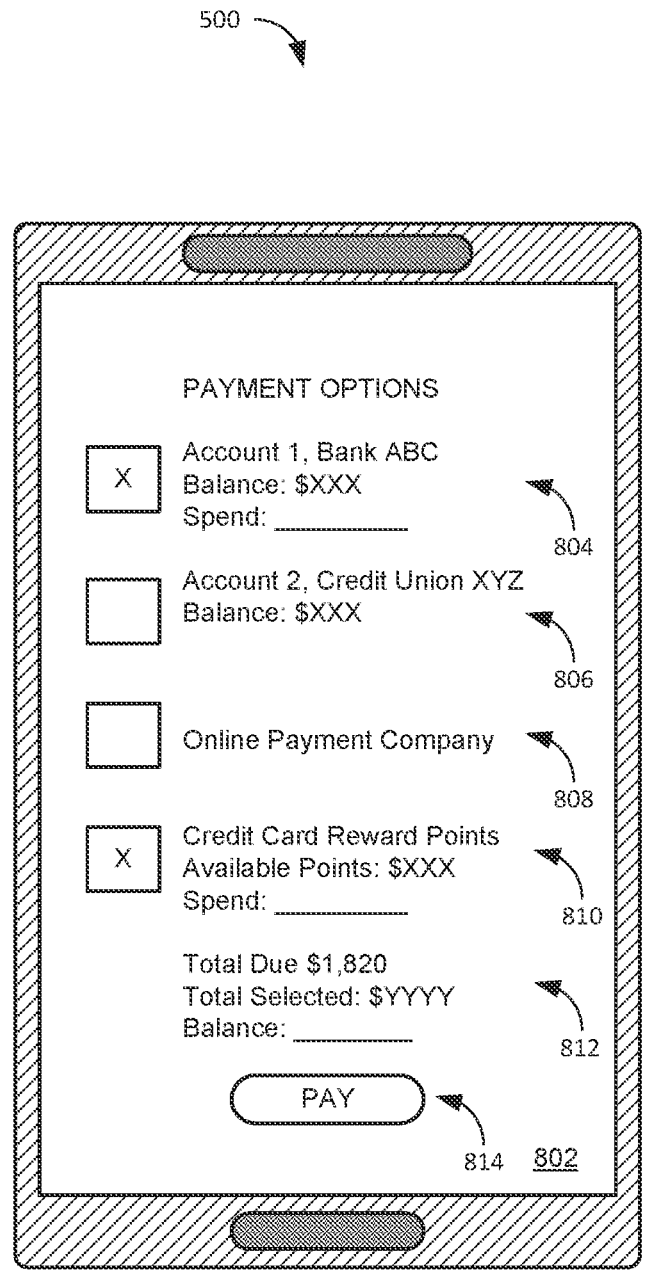
FIG. 8 shows a "PAYMENT OPTIONS" user interface according to some embodiments the disclosed technologies.

Once the events to be paid are selected, the platform may generate a "PAYMENT OPTIONS" user interface 802 to the customer, for example as shown in FIG. 8. The total amount of money selected to pay with respect to the events and fees may be displayed, at 812. The accounts may include a variety of accounts associated with the customer including, but not limited to, a series of linked customer accounts or other funding sources may also be displayed. As an example, user interface 802 displays an account 804 at a bank "ABC" (having a balance of $XXX), an account 806 at a credit union "XYZ" (having a balance of $XXX), an online payment company account 808, and a credit card reward points account 810 (having available points worth $XXX). In this example, the customer has selected the first account 804 and the credit card reward points 810. Since these options have been selected, spend fields are shown for the first account 804 and the credit card reward selection 810. The spend fields are interactive fields that may allow the customer to enter an amount of each account to use. The total amount selected by the customer may be shown in a "Total Selected" field, at 812. Any difference between the total due and the total selected may be shown in a "Balance" field. Once all the amounts are properly selected and entered, the customer may send the funds by selecting a "PAY" button 814. Most payment transactions are completed in real time after the customer enters the account information on the payment page. The FAMS provides an acknowledgement to the customer to confirm that the transaction has been completed.

Responsive to the customer selecting the "PAY" action, the platform may implement that action. For example, the FAMS may initiate the transfer of funds from the selected accounts that the customer's account at the payor FI. The FAMS may interact directly with the FI's associated with the selected accounts, may interact with external payment providers as described above, or a combination thereof. In some embodiments, the platform may communicate the customer's selection to the payor FI, which then settles directly from the selected accounts. In these embodiments, the platform may place a hold on the selected accounts in the selected amounts to prevent the funds from being transferred out of the accounts prior to settlement.

In some embodiments, the customer may pay in cash. When a customer elects to pay in cash, the FAMS may provide instructions for their selection to be honored. For example, the customer may deposit cash at an FI branch or FI ATM to allow an FI employee to verify that the cash deposit sufficiently covers the items selected to be paid. For instance, the customer may decides to pay several items that results in an amount due of $1,638.85. They may make a deposit of $1,654.85 to cover the amount they decided to pay along with any service fee. The FAMS may provide an acknowledgement that instructs the customer how to complete the transaction. The FAMS may provide a final acknowledgement telling the customer that the transaction is complete.

In some embodiments, the FAMS allows consumers to access funds that have become available via direct deposit, transfers, electronic payments, or other means to increase their available balance to pay for items that are being presented as NSF. For instance, the customer may decide to pay several items that results in an amount due of $1,638.85. They can initiate a transfer, make a cash deposit in the FI ATM, send an electronic payment request, or even ask for assistance from a friend or family member to make a deposit or transfer into their account. They may contact the FI for an employee to verify the available balance in the account is sufficient to cover the NSF items selected, and release the transactions for payment. The FAMS may provide an acknowledgement that explains what the customer should do to complete the transaction.

Figure 9:
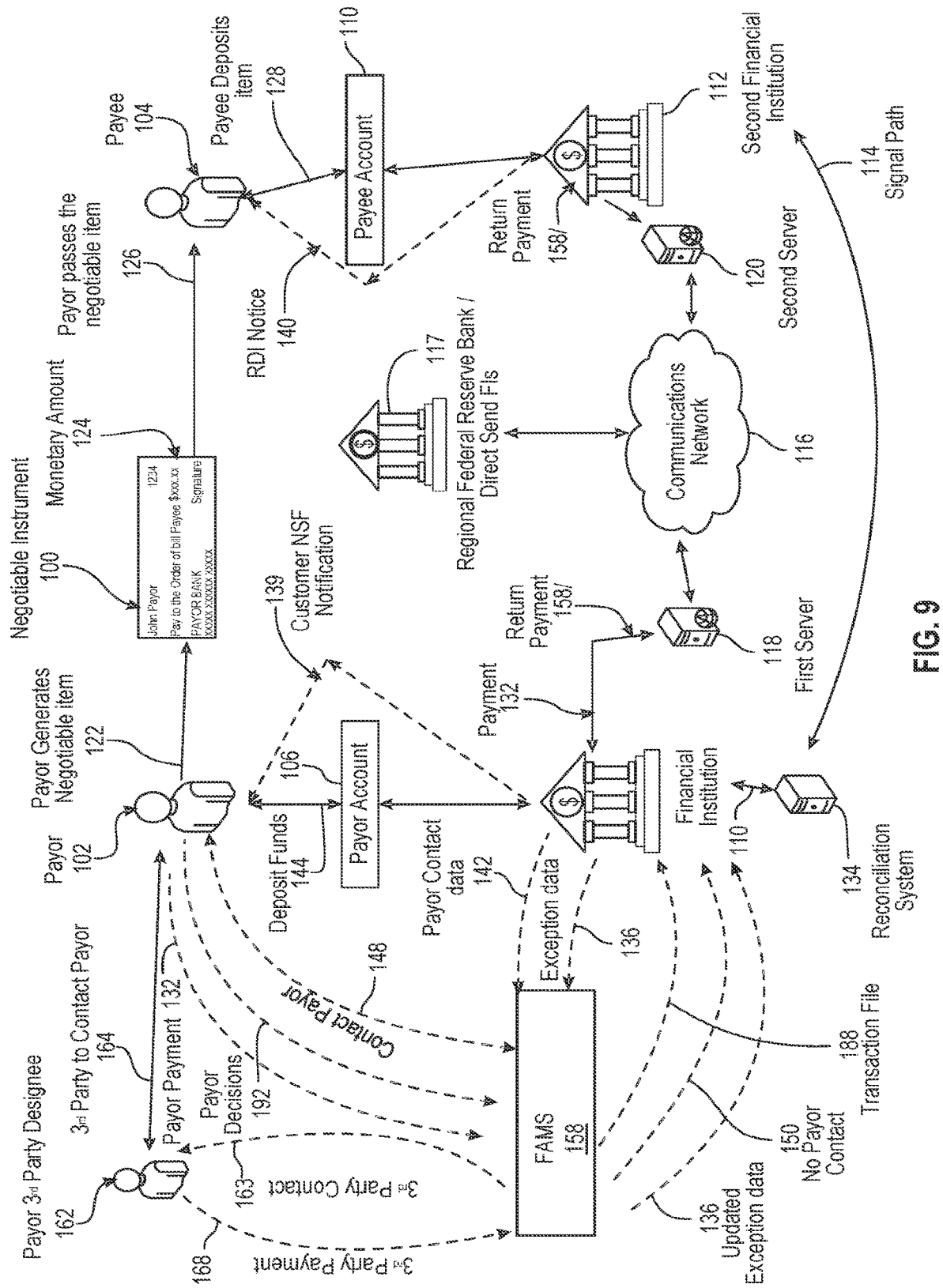
FIG. 9 shows a "start of day" process according to some embodiments the disclosed technologies.
Figure 10:
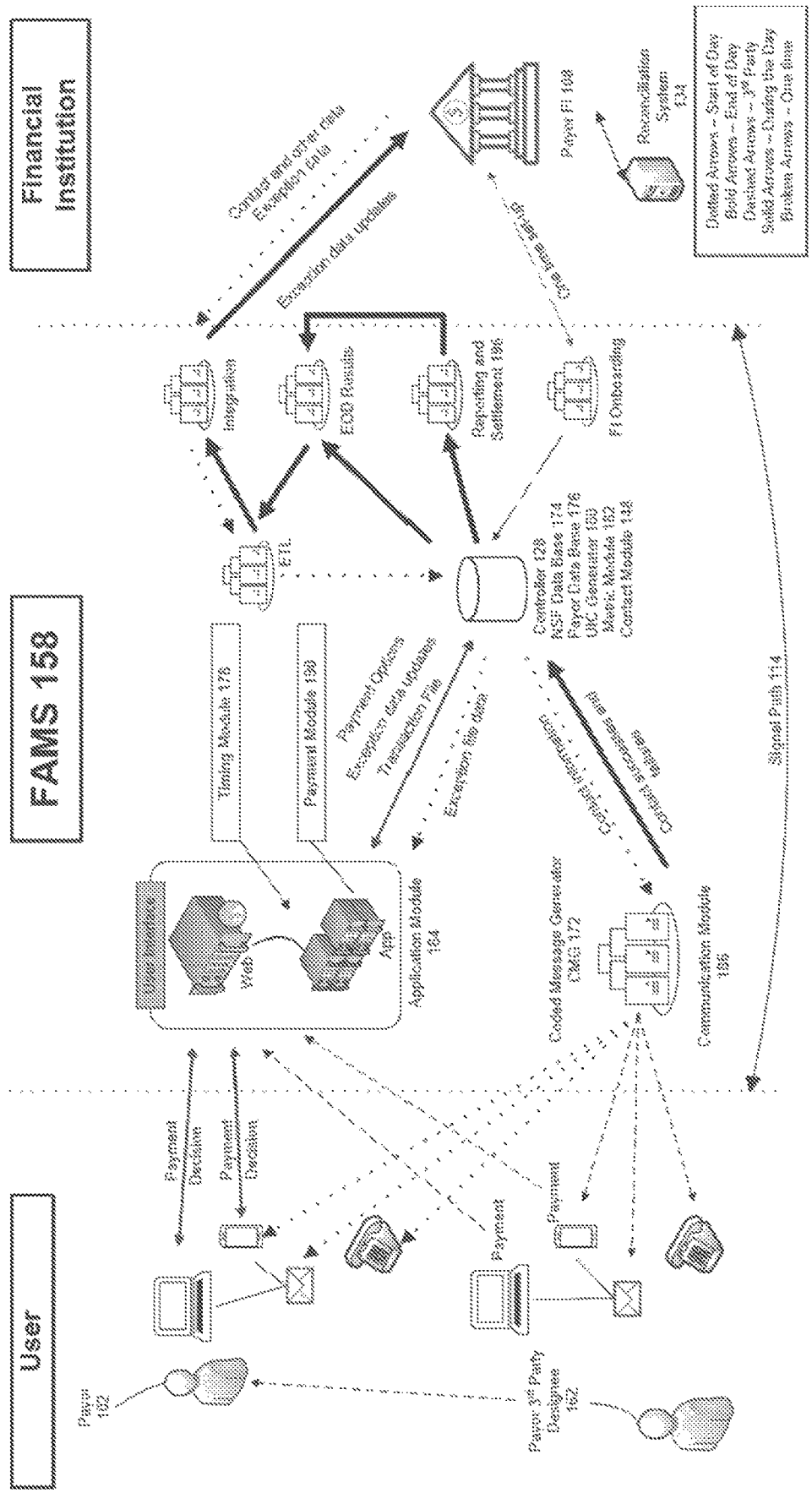
FIG. 10 is a block diagram detailing a communication process along with controls and security measures, according to some embodiments of the disclosed technologies.

FIGS. 9 and 10 are block diagrams showing details of the FAMS and its processes according to some embodiments of the disclosed technologies. Referring to FIG. 9, a "start of day" process begins with source data being generated by the payor FI core processor and staged in a data queue for secure integration into the FAMS directly from the FI core processor. The data may be encrypted in transit and encrypted at rest. The data queue then processes the data via a private key into an Extract, Transfer, Load (ETL) server. The data is then loaded into a database and a queue, segregated by FI, for a communication process to begin.

FIG. 10 is a block diagram detailing a communication process along with controls and security measures, according to some embodiments of the disclosed technologies. The communication process begins based upon criteria set up during an onboarding process with the FI. The onboarding process includes the ingestion into the FAMS of information to be used by the FAMS in interacting with the FI and its customers. This information may include business rules, risk indicators, and templates for messaging the FI and the customers, FI branding, and general information concerning the FI, for example such as branch locations, call center phone numbers, product types and preferred terminology for the products. In FIG. 10, dotted arrows indicate start of day processes, bold arrows indicate end of day processes, dashed arrows indicate 3rd party processes, solid arrows indicate during the day processes, and broken arrows indicate one time processes.

In this example, a payor 102 has a payor account 106 at a payor FI 108 and the payee 104 has a payee account 110 at a payee FI 112. In this example, the payor FI 108 and payee FI 112 are in signal communication with each over a signal path 114 which may include any known communication network 116. The communication network 116 may be a computer network such as, for example, the Internet, or a proprietary secure network. The payor 102, payee 104, or both, may be business entities or individuals. The payor account 106, payee account 110, or both, may be checking accounts. The communication network 116 may be in signal communication with a regional Federal Reserve Bank 117.

The FAMS 158 may include a communication module 186, payment module 190, controller 128, database of NSF events 174, database of payors 176, timing module 178, UIC generator 180, optional metric module 182, and application module 184. In this example, the controller 128 may be in signal communication with the communication module 186, payment module 190, database of NSF events 174, database of payors 176, timing module 178, UIC generator 180, optional metric module 182, optional coded message generator (CMG) 172, and application module 184. In this example, the FAMS 158 may be integrated into a single computer system, or alternatively, may be integrated over multiple computer systems. The FAMS 158 may be in signal communication with the payor FI 108 via signal path 114 and communication network 116. Similarly, the FAMS 158 may also be in signal communication with the payee FI 112 via signal path 114 and communication network 116. The controller 128 may be any type of processor capable of controlling the functions and operation of the modules the FAMS 158. The controller 128 may be multiple controllers acting in coordination to control the operation of the FAMS 158.

The application module 184 may be a storage device, or devices, that stores the software needed to run the controller 128 or other FAMS 158 modules. The database of NSF events 174 is a FAMS 158 database capable of storing all the NSF events received by the FAMS 158 from the associated FIs through the EI 136 or through another sharing of customer information. The database of payors 176 is another FAMS 158 database capable of storing all the customer information related to the payors that may either be received from the associated FIs (through the EI 136, payor contact data 142, or combination of both) or from the individual customers, which may include the payor 102. The FAMS 158 may also include other databases and storage devices (such as random-access memory ("RAM") modules), which are not shown, that allow the processing of the data within the database of NSF events 174 and database of payors 176.

In this example, the payor 102 generates the negotiable instrument 100 that lists a monetary amount 124 and passes 126 it to the payee 104 physically or electronically. In this example, the negotiable instrument 100 is drawn on the payor account 106 such that the payor 102 is a "Drawer" of the payor account 106 and the payor FI 108 is a "Drawee" because the payor FI 108 is where the negotiable instrument 100 can be presented for payment from the payor account 106. The payee 104 deposits 128 the negotiable instrument 100 into the payee account 110 physically or electronically. Once the negotiable instrument 100 is deposited into the payee account 110, the payee FI 112 may present the negotiable instrument 100 to the payor FI 108 for payment via the signal path 114 that includes the communication network 116. In response, the payor FI 108 sends a payment 132 in the monetary amount listed on the negotiable instrument 100 via first computer server 118. The payor FI 108 may utilize a Check21 compliant system or other interbank transaction system.

In this example, once the payor FI 108 has sent the payment 132 to the payee FI 112, the payor FI 108 then withdraws the funds from the payor account 106 and determines whether sufficient funds are available in the payor account 106 to pay the listed monetary amount of the negotiable instrument 100. If the funds are available in the payor account 106, the listed monetary amount of the negotiable instrument 100 is withdrawn from the payor account 106 to satisfy the payment 132 made by the payor FI 108. If, instead, the payor FI 108 determines that there are insufficient funds in the payor account 106 to pay the listed monetary amount of the negotiable instrument 100, the clearing process designates the negotiable instrument 100 as causing an event for the payor account 106 and then places it as an NSF event in EI that will be generated the next business day by the payor FI 108. In this example, the clearing process may be performed by a computer system such as, for example, a reconciliation system 134. The reconciliation system 134 may be optionally part of the first server 118 or another independent computer system of the payor FI 108. The reconciliation system 134 may include software that includes rules and decision engines/modules to reconcile the amount paid on behalf of the payor 102 with the funds available from the payor account 106.

The reconciliation system 134 has access to the payor FI 108 customer lists and corresponding accounts such that it may generate a daily EI 136 that includes all events presented that resulted in a final balance less than zero, insufficient collected funds or NSF events with the corresponding negotiable instruments that caused the NSF events, the corresponding accounts of the negotiable instruments, and the corresponding customer information of the accounts.

An example of operation of the FAMS 158 starts with receiving an electronic file including the EI 136 and payor contact data 142 from the payor FI 108 at the communication module 186. If the negotiable instrument 100 has caused an NSF event, the negotiable instrument 100 will be listed as an NSF event in the EI 136. The payor contact data 142 may include the payor's account information, contact information, and personal information. In some cases, the payor contact data 142 may include contact data for a third-party designee such as, for example, a spouse, parent, offspring, sibling, friend, or business colleague. The EI 136 and payor contact data 142 received by the communication module 186 is passed to the database of NSF events 174 and database of payors 176, respectively.

The controller 128 and UIC generator 180 may generate a unique identifier code ("FAMS UIC") to uniquely identify the NSF event (or events) corresponding to the payor. The FAMS 158 may generate a plurality of UICs that are stored in a database (not shown) corresponding to different NSF events. By utilizing the plurality of UICs, corresponding financial institution that associated with the FAMS's organization may utilize the UICs to identify a NSF event and the corresponding payor.

The timing module 178 generates a FAMS time period based on the payor FI predetermined time period. The payor FI predetermined time period may be specified by the payor FI during onboarding, or may be transferred to the FAMS with the EI each day. The payor FI predetermined time period is generally the time from which the NSF event was identified by the payor FI 108 to the cut-off time to reconcile the accounts at the payor FI 108. Generally, financial reconciliation information 134 is sent from the payor FI 108 to one of the regional Federal Reserve Banks 117 at this cut-off time unless the payor FI 108 utilizes a reconciliation process that does not utilize a regional Federal Reserve Bank 117. The payor FI cut-off time may vary based on the time zone of the corresponding Regional Federal Reserve Bank 117 with which the payor FI 108 has an account.

The FAMS time period may differ from the FI predetermined time period. In some embodiments, the FAMS time period may take into account the time lag in receiving the payment 132 from the payor 102. In some cases, the FAMS may have a contractual obligation to guarantee payment to the payor FI 108 when the FAMS receives payment from the payor within the FI predetermined time period. In some cases the FAMS may specify different time periods for different payors based on stored business rules and other criteria, which may include criteria related to the financial institution's or the FAMS's historical dealings with payor, contractual agreements with payor, and estimates of credit worthiness of the payor.

On receiving the EI 136, the FAMS 158 may launch the communication module 186 to notify the customers that are included in the EI 136 using the contact information provided by payor FI 108. The communication module 186 may employ electronic contact methods based on the contact information provided for the payor 102 may include, for example, robo-callling the payor's home, work with either pre-recorded or computer generated voice messages, and/or mobile telephone numbers, generating a computer message that can be utilized by a call center person to call and potentially talk to the payor, sending computer generated text messages to payor's mobile device, and sending computer generated e-mails to the payor's personal and/or work emails. If contact with the payor 102 is established (e.g., someone picked up the phone when called, a voicemail was left on one of the listed phone numbers, or texts and/or emails were sent without bouncing back), the FAMS may note the time that contact was made in its database and may keep track of the time left for the payor 102 to respond before a FAMS time period has run out. The FAMS may be configured to send out repeat notifications if there is no customer contact in a specified period of time. Data may be retained as to contact failures with phone numbers, e-mail addresses and SMS messages. The FAMS may utilize a third party to provide updated contact information to the payor FI 108.

A contact module 148 may receive approved templates from the payor FI 108 for contacting the payor. The templates may contain language, text, links, payor FI 108 name, and payor FI 108 web sites. The contact module 148 may provide the link for the customer to take action. The link may be provided in a secure manner utilizing security processes designated by the payor FI 108.

The controller 128 and a message module (not shown) may generate a voice pre-recorded or machine generated message to send via telephone or a textual message to send via textual communications means such as, for example, email, mobile text messaging, or social media-based text messaging. The message may be explicit such as, for example, "You need to contact Bank 'A' regarding reference number X.XX.X." In the case that the payor 102 is a customer of the FAMS 158, the message may be even more explicit such as, for example, "You need to contact Bank 'A' regarding X number of NSF events, please use reference number XXXX."

Alternatively, the controller 128 and optional CMG 172 may generate a coded message to send to the payor 102 in instances when privacy is required such that less explicit communications and/or codes should be utilized. These coded communications may be coded via a safe word or password. The controller 128 in combination with the database of payors 176 may then attempt to contact the payor 102 via the different forms of contact provided the payor contact data 142. The communication module 186 may time stamp each communication attempt with the payor 102 and store that time stamp in the database of NSF events 174, database of payors 176, other database (not shown), or combination of one or more of these. The time stamp may include the data and time that the attempted communication was made. The FAMS 158 may also record in one of the databases the time stamp, form of communication attempted, and whether the attempt was successful in reaching the payor 102 (e.g., a voicemail was left on the cellphone of the payor, the payor 102 received the call and possibly gave confirmation of receiving the call, and an email and/or text message was successfully sent). In these examples, each successful form of communication sent to the payor 102 includes communicating the FAMS time period and the need for the payor 102 to respond to the FAMS 158 before the expiration of the FAMS time period. If the payor 102 responds to the FAMS 158 before the expiration of the FAMS time period, the FAMS 158 informs the payor 102 of the possible options for curing the event. The FAMS 158 may communicate to the payor 102 the required payment amount, how payment may be made, and the time limit to pay based on the FAMS time period.

If the FAMS 158 is unsuccessful in reaching the payor 102 or if the payor 102 designates a third-party designee 162, the FAMS 158 may attempt to contact the third-party designee 162. The FAMS 158 may utilize the process described above in contacting the third-party designee 162. However, the messages may be different because the messages may attempt to reach the payor 102 through the third-party designee 162 and possibly allow the third-party designee 162 to make a payment 168 to the FAMS 158 for the payor 102. In this variation, the controller 128 and a message module (not shown) may generate a voice pre-recorded or machine generated message to send via telephone or textual communications means such as, for example, email, mobile text messaging, or social media-based text messaging. The message may be explicit such as, for example, "Please let [payor] know that he/she needs to contact Bank 'A' regarding reference number XXXX." In the case that the payor is a customer of the FAMS 158, the message may be even more explicit such as, for example, "Please let [payor] know that they need to contact Bank 'A' regarding X number of NSF events, please use reference number XXXX". Alternatively, the controller 128 and optional CMG 172 may optionally generate a coded message to send to the third-party designee 162 in instances when privacy is required such that less explicit communications and/or codes should be utilized. This coded message may be different than the coded message that would be generated for the payor 102 had the FAMS 158 contacted the payor 102 directly. The message to the third-party designee 162 may also include information allowing the third-party designee 162 to make the payment 168 for the payor 102. In this example, the message to the third-party designee 162 may be for example, "Hello, [third-party designee] we are contacting you in an attempt to reach [payor] regarding the need to contact Bank 'A' regarding an urgent issue. If you would like to contact Bank 'A' for [payor], please use reference number XXXXX."

The payment module 190 may be a device, devices, subsystem, or software/hardware module that is capable of receiving the payment 132 from the payor 102. The payment module 190 may include a website interface, software and hardware required to allow reception of payment 132 at other FIs, at ATMs, via electronic funds transfer systems, or other payment methods. When a payment 132 is received by the payment module 190 within the FAMS time period, the payment module 190 (either alone or in combination with other FAMS modules) may settle funds via the settlement module 196 to the payor FI 108 within the FI predetermined time period. The payment module 190, alone or in combination with other FAMS 158 modules such as, for example, the timing module 178, may time stamp the date and time of reception of the payment 132 from the payor 102. This information may then be saved into one of the databases in the FAMS 158. The optional metric module 182 may then evaluate how the payor 102 responds to NSF events and assign a quality score based on the historic performance of payor 102 in responding to NSF events caused by the payor 102.

This payment 132 should include at least the necessary amount of funds to cover the NSF amount. Once the payor 102 has finalized their decisioning process, the payment module 190 is presented to the payor. The payment module 190 reflects the insufficient balance, if any, the transaction fee amount, a drop-down list box (DDLB) listing various payment options that the payor establishes, a transaction reference number, and a printable and/or emailable receipt. This reference number matches the reference number on the transaction file that will be sent to the payor F 108.

If payment is made within the FAMS generated time period, the FAMS creates an electronic transaction file to be processed by the payor FI 108. The funds received by the payor FI 108 are applied to the payor account 106 to remedy one or more of the negotiable instruments that caused the NSF event in the account. In addition, the payor FI exception file is sent back to the payor FI 108 from the FAMS to update "Pay", "Return" or "Fraud" indicators in order to process the exception file events appropriately. As a result, negotiable events are either paid through the payor's account or returned to the payee FI 112. If paid, the settlement module 196 settles the transaction by reconciling funds and fees that are due to the payor FI. On the other hand, upon receiving a returned negotiable instrument, the payee FI 112 will debit the payee's account along with the applicable fees, and send a returned deposited item notice (RDI) to the payee.

In the case that the payor 102 does not contact the FAMS 158 within the FAMS generated time period, does not either agree to make the necessary payment 132, or makes the payment 132 past the expiration of the FAMS time period, the FAMS 158 does not make the funds payment to the payor FI 108 within the payor FI predetermined time period. As such, at the expiration of the payor FI predetermined time period, the payor FI 108 will include the event in the return file to the payee FI 112. The payee FI 112 will then charge the payee 104 a returned payment fee which will be withdrawn from the payee account 110.

In some embodiments, if contact information is available for a third-party designee 162, the FAMS 158 may try to contact the payor's third-party designee 162 based on the information provided by the payor FI 108 (in the payor contact data 142) or a customer database (not shown) of the FAMS 158 if the payor 102 is a customer of the FAMS's organization. Once the third-party designee 162 is contacted, the FAMS 158 may instruct the third-party designee 162 to contact the payor 102 so that the payor 102 may respond to the request within the FAMS time period and/or allow the third-party designee 162 to respond directly to the FAMS 158 for payment arrangements. If the payor 102 responds to the FAMS 158 in response to the FAMS 158 contacting the third-party designee, the process proceeds as described earlier. On the other hand, if the third-party designee 162 responds to the FAMS 158, the FAMS 158 may allow the third-party designee 162 to make the same type of payment arrangements as described above in relation to the payor 102. In some embodiments, the FAMS 158 may allow a combination of payment 168 and 132 from both the payor 102 and third-party designee 162.

In some embodiments, the payor 102 or third-party designee 162 may go to another financial institution (such as, for example, payee FI 112) to make a payment 168 or 132. Once at the other financial institution, the payor 102 or third-party designee 162 may present the UIC to a financial institution teller (or enter it in an automated payments station such as, for example an ATM). The FI teller or automatic payment station will recognize the UIC and allow the payments 168, 132, or combination of both, to be made.

In this example, the other FI may charge a convenience fee to the payor 102 or third-party designee 162. Similarly, with the UIC, the FAMS 158 may allow the payor 102 or third-party designee 162 to pay via a telephone call center, online via an Internet website, and via a mobile application. In addition to the UIC, the FAMS 158 may utilize coded messages to allow the payor 102 to keep his/her privacy. These communications may be coded via safe word, alpha numeric code, or other private type of communication.

FIG. 11 shows an example EI data structure that includes tabular data regarding the NSF events and contact information for the payors corresponding to the NSF events. In this example, the data structure may include the date that the NSF event was generated, the time that NSF event was communicated to the FAMS 158, a customer number for the payor, the UIC for the payor, the name of the payor, account number for the payor account, contact information for sending text messages, contact information for sending pre-recorded or machine generated audio messages to a telephone number, contact information for sending emails, contact information for sending emails to the third-party designee, contact information for sending text messages to the 3rd party designee, contact information for sending pre-recorded or machine generated audio messages to a telephone number corresponding to the third-party designee, and information regarding the requestor that sent the NSF event to the FAMS 158. This EI data structure may include payor contact data 142, and may be stored in one or more FAMS 158 databases.

FIG. 12 shows an example contact data structure that includes contact information related to each customer shown in FIG. 11. This data structure is specific to the NSF event and contact information for each customer in FIG. 12. In this example, the data structure includes the customer number, contact information that corresponds to the contact information for sending text messages, contact information for sending pre-recorded or machine generated audio messages to a telephone number, contact information for sending emails, contact information for sending emails to a third-party designee, contact information for sending text messages to the third-party designee, and contact information for sending pre-recorded or machine generated audio messages to a telephone number corresponding to the third-party designee.

FIG. 13 shows an example contact results data structure. The data structure includes time stamp data of a time of receipt of the NSF event(s) that includes the date sent and time sent from the payor FI 108, time stamp data of the date and time that the FAMS 158 contacted and sent the message to either the payor or 3rd party designee, and the type of message sent. The data structure includes the actual dates and times that the messages were delivered (e.g., when the payor/third-party designee received the voice message, when the FAMS 158 left a voicemail on their respective telephones, or when the text or emails were sent without being returned as undeliverable). The data structure may also indicate the messages were not delivered, for example by indicating "no answer", "returned", or "undeliverable". The columns for date sent and time sent may include other NSF events for that payor that have occurred that day. In this example, three NSF events are shown. In this example, the time sent for all three NSF events vary from 8:05:05 AM to 8:07:05 AM even though all three NSF events were sent by the FI to the FAMS 158 at the same time, 8:05:05 AM.

Figure 14:
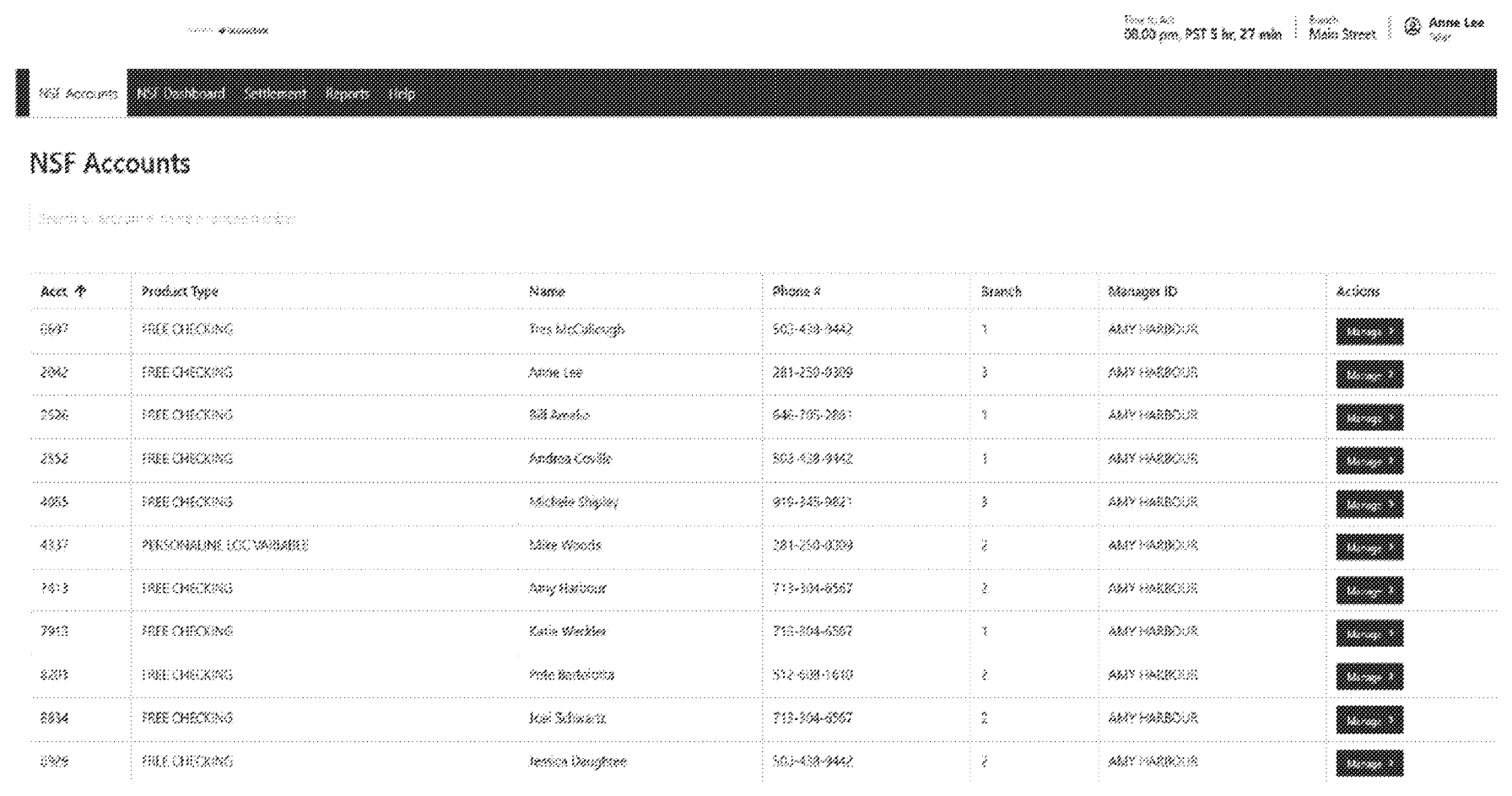

FIG. 14 shows an example summary of NSF events that may be provided by the FAMS to a FAMS administrative user. The summary may also be provided to the payor FI 108. The summary may be searched using key points of information. Those key points may include account number, name, and phone number. The "Manage" function in FIG. 14 takes the user to a decision page.

Figure 15:
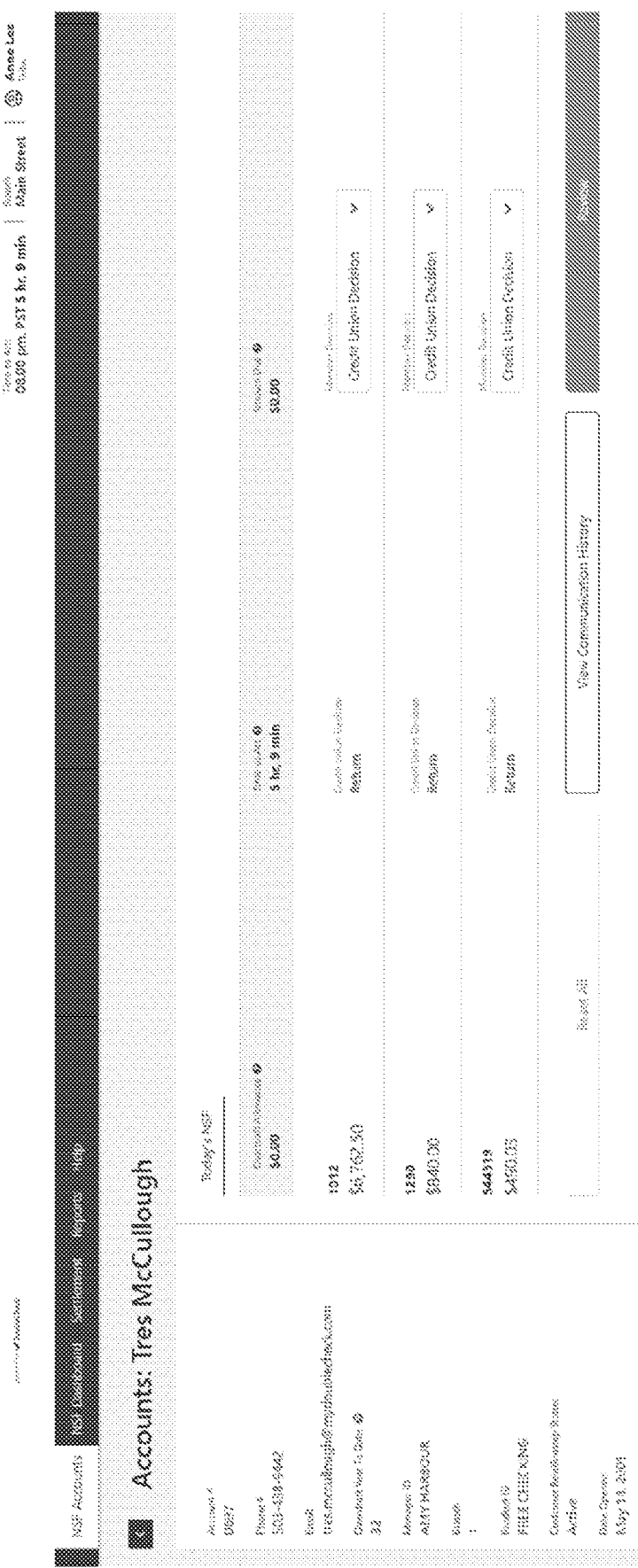
FIG. 15 shows an example decision page.

FIG. 15 shows an example decision page. From this point an administrative user (e.g., a FAMS or FI employee) can service the customer in a quick and efficient manner. Built into this page is an acknowledgement for a customer to acknowledge authorizing the user to take action. For example, the user can take a cash deposit and acknowledge the cash has been deposited or verify that available funds are sufficient to pay the NSF events that the customer has selected.

Figure 16:
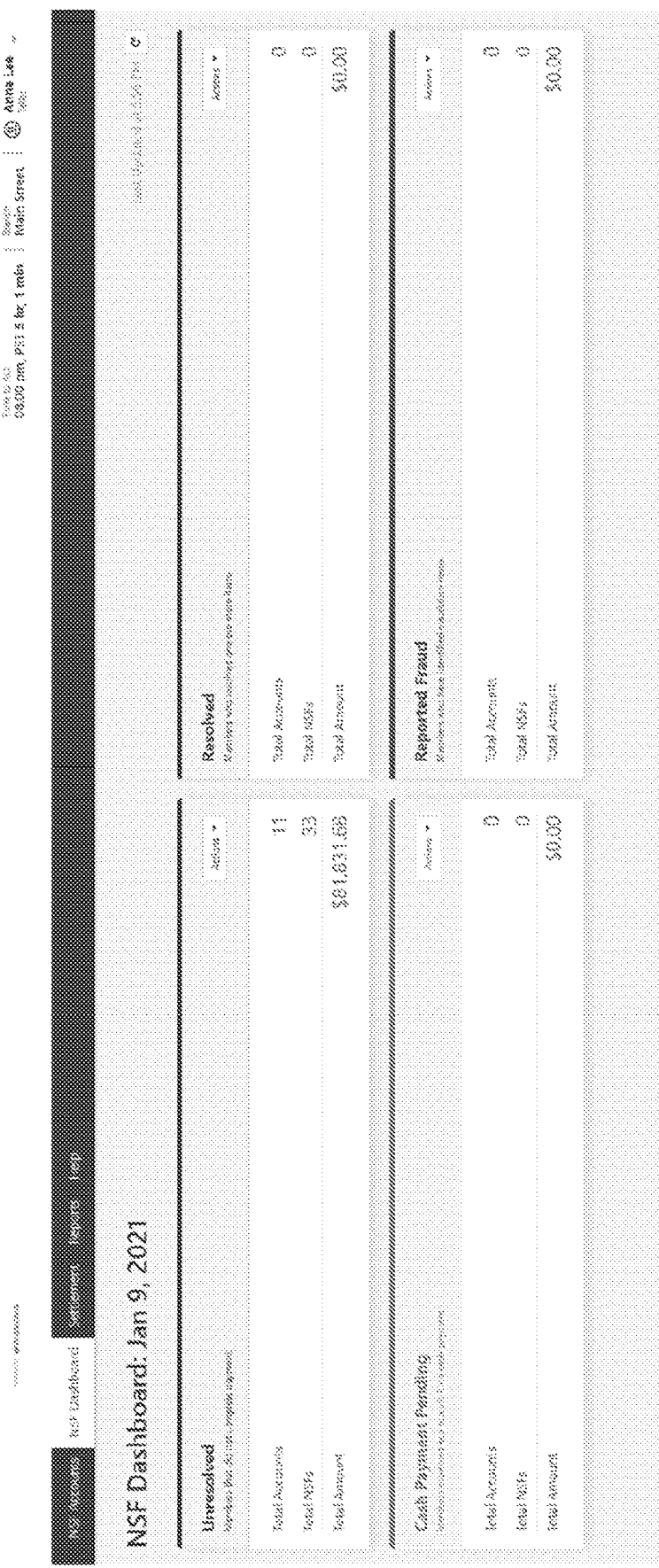
FIG. 16 shows an example NSF dashboard that allows administrative users to quickly view details relating to NSF events.

FIG. 16 shows an example NSF dashboard that allows administrative users to quickly view details relating to NSF events. The dashboard displays four (4) sections that are organized by status of the NSF. The first section displays all of the "Unresolved" NSF events. These are the events that have not been acted upon and therefore may be returned if the customer does not act in the designated window of time. The "Actions" button presents all the details behind the unresolved events. The second section is the "Resolved" NSF events. This displays the resolved NSF events along with an "action" button to view the details. The third section is "Cash Payment Pending". This is important if customers have indicated they will make a cash deposit but have not done so yet. This allows proactive measures to be taken by the financial institution to serve its customers. The fourth section is "Reported Fraud". These are all of the NSF events that have been designated by the customer as fraudulent. This function performs some additional actions to inform the financial institution aware that a fraudulent event has been reported. If the fraud option is selected by the customer, and the customer has submitted the transaction, the FAMS automatically sets the decision to "return" and sends a notification to the FI fraud department. This allows the fraud department to complete its fraud policies and procedures and protect the financial institution from losing money on the fraudulent event.

Figure 18:
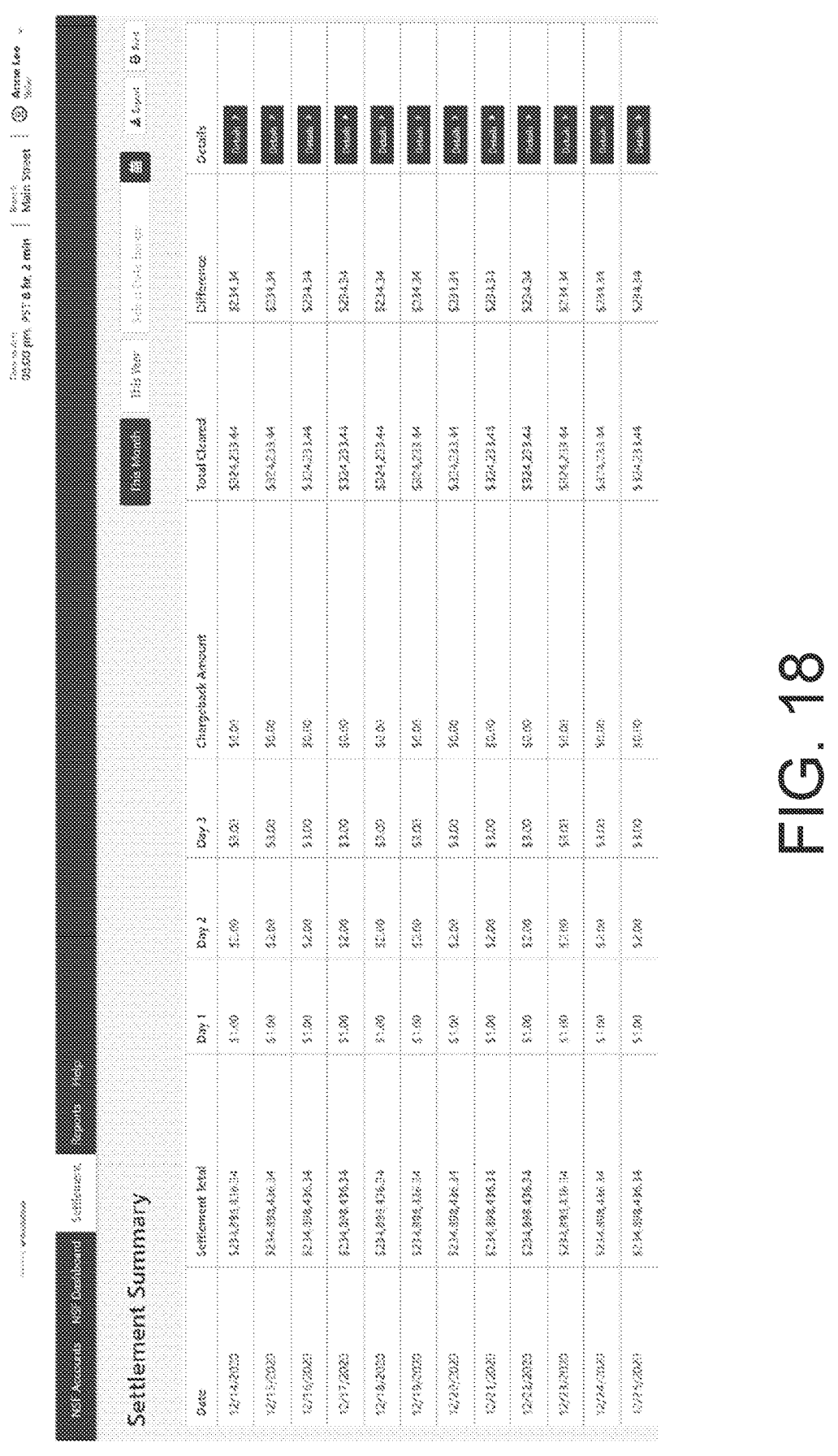

FIG. 17 depicts an example confirmation a customer receives for reference. FIG. 18 depicts an example settlement summary provided to the payor FI to assist in balancing each day's settlement process.

As the FAMS 158 receives the EI, payor contact data, and contact and personal information from the individual customers, the FAMS 158 may store all of the received data into one or multiple databases 174 & 176. From the information data in this, or these, database(s), the FAMS 158 may organize and analyze this information data to provide optional features. These optional features may include providing the FAMS 158 customers (including the FIs, companies and the individual customers associated with the FAMS 158) with other types of notifications, scoring and information. Specifically, the FAMS 158 may include one of more modules such as, for example, an optional Measure of Good Action Metric System ("MOGA"), an optional Dynamic Fraud Alert System ("DFAS"), an optional Financial Escheat System ("FES"), and an optional Mobile Interface for Financial Alert System ("MIFAS").

The MOGA may be utilized to create a historic rating of how customers resolve NSF events on their payor accounts or company invoice payments (i.e., metric scores). In general, if they are timely in resolving the NSF events and/or invoice payments and therefore do not cause their respective payor FI to issue and/or send NSF notices or late notices, their MOGA generated metric scores will be high. If, on the other hand, they are not timely in resolving the NSF event or paying invoices, their MOGA generated metric scores will be low. These MOGA generated metric scores may also take into account the number of NSF events caused by payors and the amounts that caused the NSF events. For companies, the MOGA generated scores may take into account invoicing payments and amounts due. These MOGA generated metric scores may then be utilized by other FIs, companies, and individuals to determine whether they will accept a negotiable instrument from a person that has a MOGA generated metric score.

Another possible MOGA metric score is a type of "credit score" for individual customers that indicates how "good" an individual customer is in following through with their payments. A high MOGA metric score may allow the FAMS 158 to have some flexibility in how it deals with an individual customer when a NSF event happens. For example, if an individual customer is a payor that causes an NSF event by generating and passing a negotiable instrument that causes an insufficient funds event, the FAMS 158 may receive the information on the NSF event caused by the payor, and may compare the NSF event amount against the payor's MOGA metric score to determine the likelihood of the payor paying on time the amount necessary to resolve the NSF event. As described earlier, the FAMS time period is generally equal to or less than the FI predetermined time period so that the FAMS 158 has sufficient time to obtain a payment of funds from the payor that caused the NSF event. But in this example, if the payor's MOGA metric score is high, the FAMS 158 may generate a FAMS time period for the payor to pay the FAMS 158 that is greater than the FI predetermined time period. because a high MOGA score may indicate that the payor is trustworthy enough to pay the amount required based on previous performances. In this example, the FAMS 158 may charge an additional fee to the payor for extending the FAMS generated time period. This fee may be part of subscription service if the payor is a FAMS 158 customer. In this example, the FAMS 158 may indicate to the corresponding FI either that the payor has made the payment and that the FI should pay the negotiable instrument that caused the NSF, or FAMS 158 may send the required payment to the corresponding FI or company and then seek payment from the payor.

In some embodiments, a Dynamic Fraud Alert System (DFAS) may utilize the information stored in the FAMS 158 database(s) to constantly monitor the NSF events that are received from the different FIs against known payor personal data to detect possible fraud. For example. If multiple NSF events appear to be associated with the same payor personal data (e.g., social security numbers, driver's license numbers, home addresses, and telephone numbers) but are being received from different FIs, the payor's personal data may have been compromised and someone is producing fraudulent negotiable instruments using the payor's personal data. The DFAS may then produce a suspected fraud alert to all associated FIs and vendors (e.g., retail stores) that informs these entities to hold, review, use caution, or do not accept checks from this payor until the suspected fraud alert has been resolved. In the case of payors that legitimately have different accounts at different FIs that are listed in the FAMS 158 database(s), the FAMS 158 may not issue a suspected fraud alert. In today's economic environment, identity fraud is a large and growing problem. While generally laws exist that protect individuals from financial fraud, generally there are no such laws protecting business against the same fraud. As such, these suspected fraud alerts allow business to avoid potential losses by refusing to accept negotiable instruments from the associated payor.

In general, many FIs have some accounts and/or safety deposit boxes that are old and inactive, but which they cannot legally close out without contacting the owners. But in some cases the owners are unavailable or simply cannot be have found by the FI. Some embodiments provide a Financial Escheat System (FES) to solve this problem. The FES may utilize information stored in the FAMS 158 database(s), any may utilize a centralized hub which can request, mine or scrape information from member FIs, plus public information gathered from other public sources. This information may include, for example, credit reports, news reports, social media posts, and Internet search engine results. The FIs may compile an escheat list of the unavailable owners. The FES may then search for the payors on the escheat lists based by searching the FAMS database(s) and other available information from external sources. If a hit is found, the FES may either contact the payor directly for the FI (and may charge an associated fee), or may send the contact information to the requesting FI so the FI may make contact with the payor.

Figure 19:
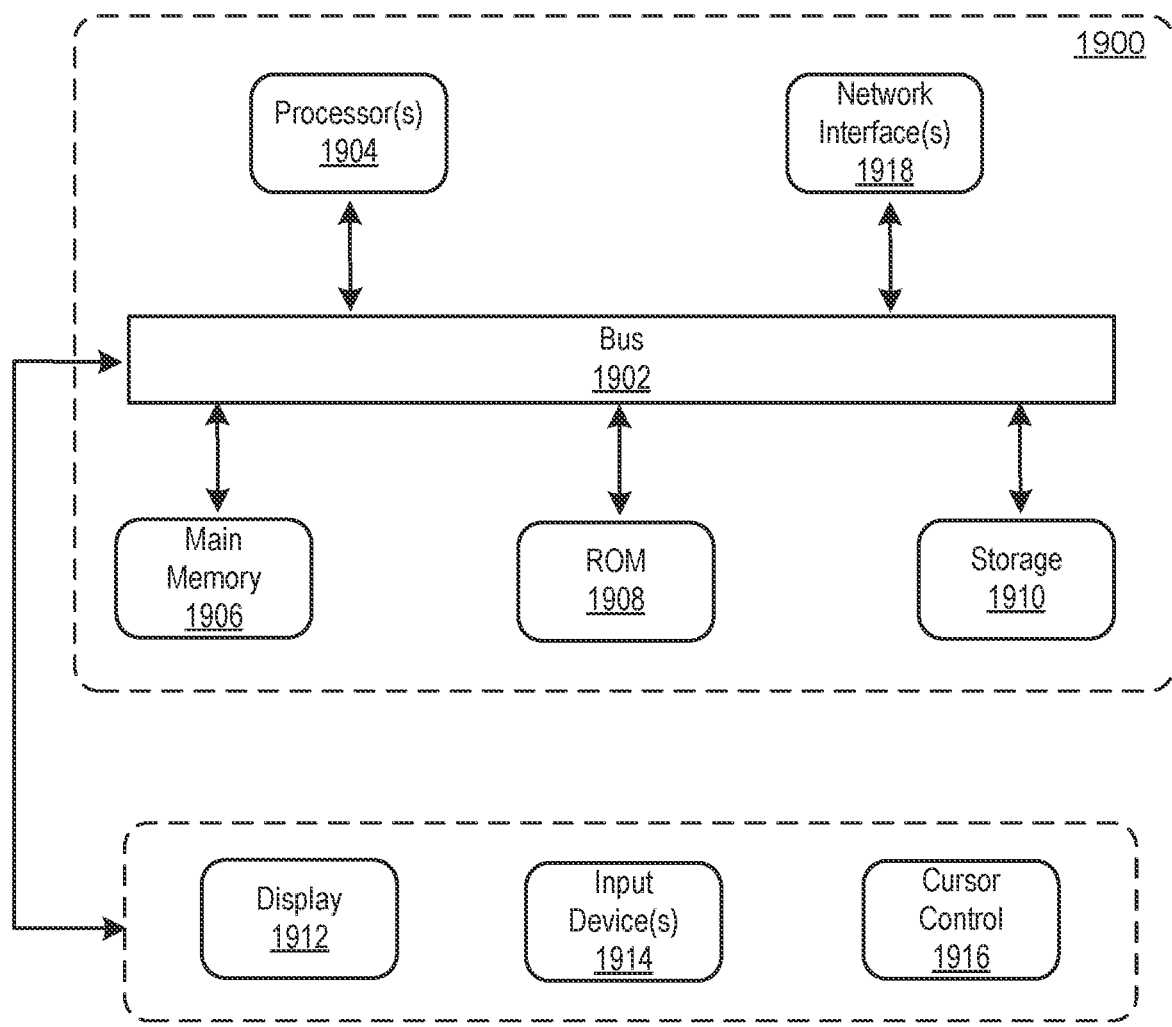
FIG. 19 is an example computing component that may be used to implement various features of embodiments described in the present disclosure.

FIG. 19 depicts a block diagram of an example computer system 1900 in which embodiments described herein may be implemented. The computer system 1900 includes a bus 1902 or other communication mechanism for communicating information, one or more hardware processors 1904 coupled with bus 1902 for processing information. Hardware processor(s) 1904 may be, for example, one or more general purpose microprocessors.

The computer system 1900 also includes a main memory 1906, such as a random access memory (RAM), cache and/or other dynamic storage devices, coupled to bus 1902 for storing information and instructions to be executed by processor 1904. Main memory 1906 also may be used for storing temporary variables or other intermediate information during execution of instructions to be executed by processor 1904. Such instructions, when stored in storage media accessible to processor 1904, render computer system 1900 into a special-purpose machine that is customized to perform the operations specified in the instructions.

The computer system 1900 further includes a read only memory (ROM) 1908 or other static storage device coupled to bus 1902 for storing static information and instructions for processor 1904. A storage device 1910, such as a magnetic disk, optical disk, or USB thumb drive (Flash drive), etc., is provided and coupled to bus 1902 for storing information and instructions.

The computer system 1900 may be coupled via bus 1902 to a display 1912, such as a liquid crystal display (LCD) (or touch screen), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. In some embodiments, the same direction information and command selections as cursor control may be implemented via receiving touches on a touch screen without a cursor.

The computing system 1900 may include a user interface component to implement a GUI that may be stored in a mass storage device as executable software codes that are executed by the computing device(s). This and other components may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1900 may implement the techniques described herein using customized hard-wired logic, one or more ASICs or FPGAs, firmware and/or program logic which in combination with the computer system causes or programs computer system 1900 to be a special-purpose machine. According to one embodiment, the techniques herein are performed by computer system 1900 in response to processor(s) 1904 executing one or more sequences of one or more instructions contained in main memory 1906. Such instructions may be read into main memory 1906 from another storage medium, such as storage device 1910. Execution of the sequences of instructions contained in main memory 1906 causes processor(s) 1904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1910. Volatile media includes dynamic memory, such as main memory 1906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1902. Transmission media can also take the form of acoustic or light waves, such as those generated during radio-wave and infra-red data communications.

The computer system 1900 also includes a communication interface 1918 coupled to bus 1902. Network interface 1918 provides a two-way data communication coupling to one or more network links that are connected to one or more local networks. For example, communication interface 1918 may be an integrated services digital network (ISDN) card, cable modem, satellite modem, or a modem to provide a data communication connection to a corresponding type of telephone line. As another example, network interface 1918 may be a local area network (LAN) card to provide a data communication connection to a compatible LAN (or a WAN component to communicate with a WAN). Wireless links may also be implemented. In any such implementation, network interface 1918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1918, which carry the digital data to and from computer system 1900, are example forms of transmission media.

The computer system 1900 can send messages and receive data, including program code, through the network(s), network link and communication interface 1918. In the Internet example, a server might transmit a requested code for an application program through the Internet, the ISP, the local network and the communication interface 1918.

The received code may be executed by processor 1904 as it is received, and/or stored in storage device 1910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
   a hardware processor; and
   a non-transitory machine-readable storage medium encoded with instructions executable by the hardware processor to cause the system to perform operations for providing alert management and real-time remediation, the operations comprising:
   receiving an electronic file from a server associated with an institution, the electronic file comprising an exception information data structure comprising exception information representing one or more events and a customer associated with respective ones of the one or more events;
   generating an event notification message, to an electronic address of a customer, including a link to an authentication interface of the server associated with the institution;
   transmitting the generated event notification message, including the link to an authentication interface, to the electronic address of the customer;
   receiving a communication from the authentication interface, the communication relating to authentication of the customer;

determining based on the communication received from the authentication interface, whether the customer was successfully authenticated by the authentication interface; and responsive to determining the customer was successfully authenticated by the authentication interface, providing a user interface to the electronic address of the customer for display to the customer, wherein the user interface is configured to display information for the one or more events and includes one or more user-selectable options.

2. The system of claim 1, wherein the events represent non-sufficient funds (NSF) events in a financial account of the customer, the exception information identifying a negotiable financial instrument drawn on the financial account, wherein a monetary amount of the negotiable financial instrument exceeds an available monetary balance of the financial account.

3. The system of claim 2, the operations further comprising:
identifying the negotiable financial instrument in the user interface with a service fee and an amount due corresponding to the amount by which the monetary amount of the negotiable financial instrument exceeds the available monetary balance of the financial account, wherein the one or more user-selectable options include a payment option.

4. The system of claim 3, the operations further comprising:
responsive to the customer selecting the identified negotiable financial instrument and the option to pay the amount due, displaying multiple payment systems.

5. The system of claim 4, the operations further comprising:
determining a time interval during which the customer may remedy the one or more events;
wherein the information displayed by the user interface includes an indication of the time interval during which the customer may remedy the one or more events.

6. The system of claim 5, the operations further comprising:
responsive to the customer selecting one or more of the payment systems before the time interval has expired, initiating a payment to the financial account according to the selected payment system.

7. The system of claim 5, the operations further comprising:
responsive to expiration of the time interval, generating a user interface for display to the customer that provides an indication of the expiration of the time interval in the user interface, and disabling or removing the payment option.

8. A non-transitory machine-readable storage medium encoded with instructions that, when executed by one or more hardware processors of a computing system, cause the computing system to perform operations for providing alert management and real-time remediation, the operations comprising:
receiving an electronic file from a server associated with an institution, the electronic file comprising an exception information data structure comprising exception information representing one or more events and a customer associated with respective ones of the one or more events;

generating an event notification message, to an electronic address of a customer, including a link to an authentication interface of the server associated with the institution;

transmitting the generated event notification message, including the link to an authentication interface, to the electronic address of the customer;

receiving a communication from the authentication interface, the communication relating to authentication of the customer;

determining based on the communication received from the authentication interface, whether the customer was successfully authenticated by the authentication interface; and responsive to determining the customer was successfully authenticated by the authentication interface, providing a user interface to the electronic address of the customer for display to the customer, wherein the user interface is configured to display information for the one or more events and includes one or more user-selectable options.

9. The non-transitory machine-readable storage medium of claim 8, wherein the events represent non-sufficient funds (NSF) events in a financial account of the customer, the exception information identifying a negotiable financial instrument drawn on the financial account, wherein a monetary amount of the negotiable financial instrument exceeds an available monetary balance of the financial account.

10. The non-transitory machine-readable storage medium of claim 9, the operations further comprising:
identifying the negotiable financial instrument in the user interface with a service fee and an amount due corresponding to the amount by which the monetary amount of the negotiable financial instrument exceeds the available monetary balance of the financial account, wherein the one or more user-selectable options include a payment option.

11. The non-transitory machine-readable storage medium of claim 10, the operations further comprising:
responsive to the customer selecting the identified negotiable financial instrument and the option to pay the amount due, displaying multiple payment non-transitory machine-readable storage mediums.

12. The non-transitory machine-readable storage medium of claim 11, the operations further comprising:
determining a time interval during which the customer may remedy the one or more events;
wherein the information displayed by the user interface includes an indication of the time interval during which the customer may remedy the one or more events.

13. The non-transitory machine-readable storage medium of claim 12, the operations further comprising:
responsive to the customer selecting one or more of the payment non-transitory machine-readable storage mediums before the time interval has expired, initiating a payment to the financial account according to the selected payment non-transitory machine-readable storage medium.

14. The non-transitory machine-readable storage medium of claim 12, the operations further comprising:
responsive to expiration of the time interval, generating a user interface for display to the customer that provides an indication of the expiration of the time interval in the user interface, and disabling or removing the payment option.

15. A method of providing alert management and real-time remediation via a computer processor programmed with computer executable instructions, the method comprising:
- receiving an electronic file from a server associated with an institution, the electronic file comprising an exception information data structure comprising exception information representing one or more events and a customer associated with respective ones of the one or more events;
- generating an event notification message, to an electronic address of a customer, including a link to an authentication interface of the server associated with the institution;
- transmitting the generated event notification message, including the link to an authentication interface, to the electronic address of the customer;
- receiving a communication from the authentication interface, the communication relating to authentication of the customer;
- determining based on the communication received from the authentication interface, whether the customer was successfully authenticated by the authentication interface; and
- responsive to determining the customer was successfully authenticated by the authentication interface, providing a user interface to the electronic address of the customer for display to the customer, wherein the user interface is configured to display information for the one or more events and includes one or more user-selectable options.

16. The method of claim 15, wherein the events represent non-sufficient funds (NSF) events in a financial account of the customer, the exception information identifying a negotiable financial instrument drawn on the financial account, wherein a monetary amount of the negotiable financial instrument exceeds an available monetary balance of the financial account.

17. The method of claim 16, further comprising:
- identifying the negotiable financial instrument in the user interface with a service fee and an amount due corresponding to the amount by which the monetary amount of the negotiable financial instrument exceeds the available monetary balance of the financial account, wherein the one or more user-selectable options include a payment option.

18. The method of claim 17, further comprising:
- responsive to the customer selecting the identified negotiable financial instrument and the option to pay the amount due, displaying multiple payment methods.

19. The method of claim 18, further comprising:
- determining, by the computer processor, a time interval during which the customer may remedy the one or more events;
- wherein the information displayed by the user interface includes an indication of the time interval during which the customer may remedy the one or more events.

20. The method of claim 19, further comprising:
- responsive to the customer selecting one or more of the payment methods before the time interval has expired, initiating a payment to the financial account according to the selected payment method.

* * * * *